(12) United States Patent
Stanwood et al.

(10) Patent No.: US 6,731,946 B1
(45) Date of Patent: May 4, 2004

(54) SYSTEM AND METHOD FOR TIMING DETECTOR MEASUREMENTS IN A WIRELESS COMMUNICATION SYSTEM

(75) Inventors: Kenneth L. Stanwood, Cardiff by the Sea, CA (US); Moti Kabelly, Kfar Saba (IL); Jacques Behar, San Diego, CA (US); Yossi Keren, Oranit (IL); Steve Pollmann, Santee, CA (US); David Gazelle, La Jolla, CA (US)

(73) Assignee: Ensemble Communications, San Diego, CA (US)

( * ) Notice: Subject to any disclaimer, the term of this patent is extended or adjusted under 35 U.S.C. 154(b) by 657 days.

(21) Appl. No.: 09/721,416

(22) Filed: Nov. 22, 2000

(51) Int. Cl.⁷ ................................................. H04Q 7/20
(52) U.S. Cl. ................ 455/517; 455/452.1; 455/67.11; 370/280; 370/338; 370/328; 375/222
(58) Field of Search .............................. 455/517, 452.1, 455/450, 67.11, 423; 379/90.01, 93.01, 93.08; 725/81, 133, 62, 80; 370/328, 338, 280; 375/222

(56) References Cited

U.S. PATENT DOCUMENTS

| | | | |
|---|---|---|---|
| 3,949,404 A | 4/1976 | Fletcher et al. | |
| 4,495,619 A | 1/1985 | Acampora | |
| 5,297,144 A | 3/1994 | Gilbert et al. | |
| 5,420,851 A | 5/1995 | Seshadri et al. | |
| 5,444,698 A | 8/1995 | Kito | |
| 5,511,082 A | 4/1996 | How et al. | |
| 5,615,212 A | 3/1997 | Ruszczyk et al. | |
| 5,638,371 A | 6/1997 | Raychaudhuri et al. | |
| 5,638,374 A | 6/1997 | Heath | |
| 5,675,573 A | 10/1997 | Karol et al. | |
| 5,751,708 A | 5/1998 | Eng et al. | |
| 5,768,254 A | 6/1998 | Papadopoulos et al. | |
| 5,828,695 A | 10/1998 | Webb | |
| 5,859,619 A | 1/1999 | Wu et al. | |
| 5,890,055 A | 3/1999 | Chu et al. | |
| 5,912,641 A * | 6/1999 | Dietrich ....................... 342/354 |
| 6,006,069 A | 12/1999 | Langston | |
| 6,016,311 A | 1/2000 | Gilbert et al. | |
| 6,016,313 A * | 1/2000 | Foster et al. ................. 370/330 |
| 6,038,455 A | 3/2000 | Gardner et al. | |
| 6,094,421 A | 7/2000 | Scott | |
| 6,112,080 A | 8/2000 | Anderson et al. | |
| 6,587,444 B1 * | 7/2003 | Lenzo et al. ................. 370/330 |
| 6,614,777 B2 * | 9/2003 | Menzel et al. .............. 370/347 |
| 2003/0194973 A1 * | 10/2003 | Pasternak ..................... 455/77 |

OTHER PUBLICATIONS

Ulm., et al., "Data–Over–Cable Interface Specifications, Radio Frequency Interface Specification", Hewlett Packard Interim Specification, Doc. Control No.: SP–RFI01–970321, published Mar. 21, 1997 by MCNS Holdings, L.P., Section 6, pp. 43–85.

(List continued on next page.)

Primary Examiner—Nay Maung
Assistant Examiner—Alan T. Gantt
(74) Attorney, Agent, or Firm—Knobbe Martens Olson & Bear LLP

(57) ABSTRACT

A system that provides a wireless broadband connection between base stations and customer sites is described. The system includes indoor units within the base stations and customer sites and communicate across cables to outdoor units. The indoor units link to routers, switches and other devices and services. The outdoor units transmit and receive wireless data and send it to the indoor units. The indoor units control the timing of detector measurements in the outdoor unit by transmitting a regular, repeating control message at a predetermined time. Once the outdoor unit receives the control message, it samples its detectors and reports measurements back to the indoor unit.

28 Claims, 17 Drawing Sheets

OTHER PUBLICATIONS

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", 2$^{nd}$ Edition, Prentice Hall, Oct. 1995, Chapter 3, pp. 21–25.

Lin., et al., *"Error Control Coding, Fundamentals and Applications"*, Prentice–Hall Computer Applications in Electrical Engineering Series., 1993, pp. 315–349.

L.H. Charles Lee, "Convolutional Coding, Fundamentals and Applications", Artech House, Inc., 1997, p. 11–51.

Redl, et al., "An Introduction to GSM", Artech House, Inc., 1995; pp. 84, 85 and 95.

C.E. Shannon, "A Mathematical Theory of Communication", Bell System Technical Journal, pp. 379–423 (Part 1), 623–656 (Part II), Jul. 1948.

\* cited by examiner

HANDSHAKE BETWEEN IDU AND ODU DURING NORMAL OPERATION MODE

SYSTEM AND METHOD FOR TIMING DETECTOR MEASUREMENTS IN A WIRELESS COMMUNICATION SYSTEM

BACKGROUND OF THE INVENTION

1. Field of the Invention

This invention relates to wireless communication systems, and more particularly to a wireless communication system that provides telephone, data and Internet connectivity to a plurality of users.

2. Description of Related Art

Several systems are currently in place for connecting computer users to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network.

However, these systems suffer significant disadvantages because of the time and expense required to lay high capacity communications cables between each office. This process is time consuming and expensive. What is needed in the art is a high capacity system that provides data links between offices, but does not require expensive communication cables to be installed.

Many types of current wireless communication systems facilitate two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). Several types of systems currently exist for wirelessly transferring data between two sites.

In wireless systems using multiple access schemes, frames of time are the basic transmission unit. Each frame is divided into a plurality of slots of time. Some time slots are used for control purposes and some time slots are used for information transfer. Information is typically transmitted during time slots in the frame where the time slots are assigned to a specific subscriber unit. Subscriber units typically communicate with the base station using a "duplexing" scheme which allows for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art.

In TDD systems, duplexing of transmissions between a base station and its subscriber units is performed in the time domain. A selected subscriber unit typically communicates with a selected base station using a specific pre-defined radio frequency. The channel is time-divided into repetitive time periods or time "slots" which are employed for uplink and downlink transmissions. In contrast to FDD systems, frequency allocation or frequency reuse patterns are simplified because there is no requirement of frequency separation between the uplink and downlink transmissions.

Both the uplink and downlink transmissions occur during different pre-determined time slots using the identical radio frequency. In some current wireless communication systems, there are base stations that act as central points for receiving and transmitting data to a plurality of customer sites. These base stations typically connect to other data systems such as the Internet, the phone system or other systems that provide user data to the customer's sites. As can be imagined, it is important to maintain a strong signal between the base station and the customer sites. Thus, in conventional systems, power detectors within the base station and customer sites continually monitor wireless transmissions in order to tune the system to receive the strongest possible signal.

Unfortunately, prior customer sites relied on complicated control signals to measure transmission power levels. These control signals were implemented because in TDD systems the transmit and receive paths use the same frequency. Thus, it was possible that when the customer site equipment took a power measurement, it was actually measuring a transmission signal from a nearby customer site that was transmitting on the same frequency. The addition of the control signals ensured that power measurements were taken from the base station, and not a nearby customer site.

Moreover, in some prior systems, the customer site equipment was separated into indoor units and outdoor units. The indoor units typically included the modem and electronics for connected with the customer's equipment. The outdoor unit was installed on the exterior of the building and included the antenna for receiving and transmitting wireless user data. However, in these systems, the outdoor unit did not independently know when the base station was transmitting.

Some prior systems attempted to solve this problem by including a gating signal between the indoor unit and the outdoor unit. The gating signal could be used to instruct the outdoor unit to sample its receive detectors at a particular time, thus ensuring that the receive detectors would measure signals from the base station. Unfortunately, adding this signal to the transmission cable between the outdoor unit and the indoor unit requires costly hardware changes. In addition, transmitting the extra gating signal across the transmission cable increases spurs and other undesirable effects in the data transmission pathway.

This problem is compounded by the fact that the outdoor unit does not contain a modem. A modem could serve as a conduit for the outdoor unit to receive additional commands. Thus, the outdoor unit, by itself, cannot determine the proper time to sample the receive detectors.

Thus, what is needed in the art is a convenient system at the customer site for accurately measuring the power of transmission signals from the base station. Such a system is described below.

SUMMARY OF THE INVENTION

One embodiment of the invention is a wireless communication system having a plurality of base stations and customer sites, wherein data is transferred between said base stations and said customer sites, and wherein said system comprises preset downlink time segments for transmitting said data between the base stations and the customer sites. This embodiment includes: an indoor unit comprising a first modem configured to modulate/demodulate data transmitted between the base stations and the customer sites, wherein the indoor unit is adapted to transmit a control message at a predetermined time with respect to said preset downlink time segments; an outdoor unit comprising a micro controller and a signal detector, said outdoor unit being adapted to receive the control message and, in response to receiving said control message, read said signal detector; and a broadband cable linking the indoor unit to the outdoor unit.

Another embodiment of the invention is a wireless communication system having a plurality of base stations and customer sites, wherein data is transferred between said base stations and said customer sites, and wherein said system comprises preset downlink time segments for transmitting said data between the base stations and the customer sites. This embodiment includes: an indoor unit comprising a first modem configured to modulate/demodulate data transmitted between the base stations and the customer sites, said indoor unit further comprising a programmable memory adapted to transmit a control message at a predetermined time with respect to said preset downlink time segments; an outdoor unit comprising a micro controller and a signal detector, said outdoor unit being adapted to receive the control message and, in response to receiving said control message, read said signal detector; and a broadband cable linking the indoor unit to the outdoor unit.

Yet another embodiment of the invention is a method for measuring the strength of a signal transmitted from a base station to a customer site in a wireless communication system, wherein said wireless communication system has preset downlink time segments for transmitting data from the base station to the customer site, and wherein said customer site comprises an indoor unit and an outdoor unit. This method provides: transmitting a message from said indoor unit to said outdoor unit, wherein said message is timed to arrive at said outdoor unit at a predetermined time relative to said preset downlink time segment; and reading a detector in said outdoor unit in response to receipt of said message so that said detector is read during said preset downlink time segment.

Still another embodiment of the invention is a method for tuning a wireless communication system, wherein said wireless communication system has preset downlink time segments for transmitting data from a base station to a customer site, and wherein said customer site comprises an indoor unit having a processor and an outdoor unit having tunable attenuators. This method includes: transmitting a control message from said indoor unit to said outdoor unit, wherein said message is timed to arrive at said outdoor unit at a predetermined time relative to said preset downlink time segment; reading a detector in said outdoor unit in response to receipt of said message so that said detector will be read during said predetermined downlink time segment; transmitting a response message comprising values from said detector to said indoor unit; determining the appropriate settings said attenuators in said outdoor unit; transmitting a second control message comprising updated attenuator settings to said outdoor unit; and tuning said outdoor unit based on said updated attenuator settings.

BRIEF DESCRIPTION OF THE DRAWINGS

Like reference numbers and designations in the various drawings indicate like elements.

DETAILED DESCRIPTION OF THE INVENTION

Figure 1:
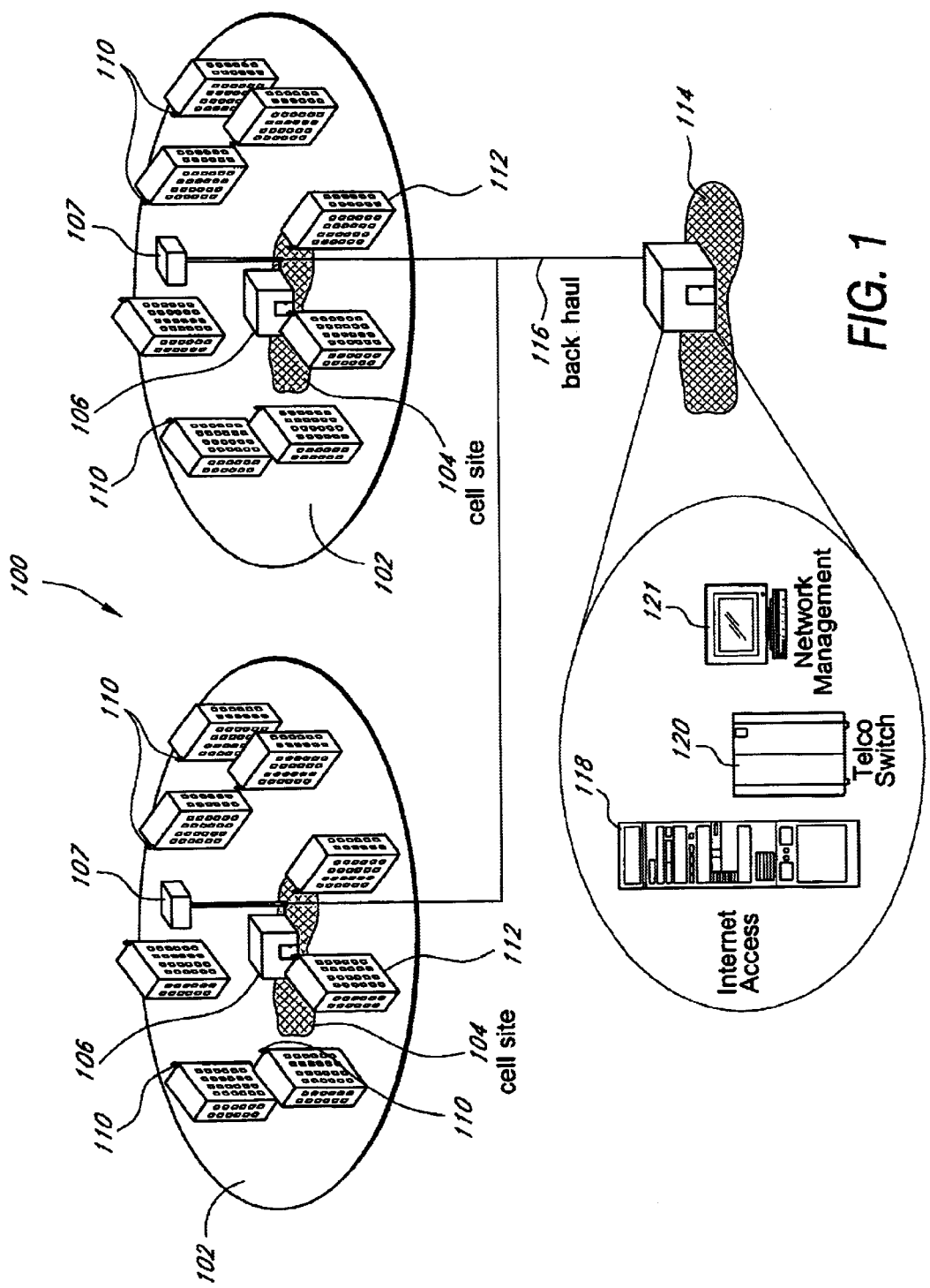
FIG. 1 is a block diagram of an exemplary broadband wireless communication system for use with the present invention.

Throughout this description, the preferred embodiment and examples shown should be considered as exemplars, rather than as limitations on the present invention.

A. Overview of the Wireless Communication System

As described above, embodiments of the present invention relate to a broadband wireless communication system. The system is particularly useful for linking a plurality of customers and businesses together to share data or access the Internet. In general, the system provides base stations that are centrally located from a plurality of customer sites. The base stations are linked to services desired by customers, such as Internet access, satellite access, telephone access and the like. Within the base stations are communication devices, such as routers, switches and systems for communications with the desired services. In addition, each base station includes one or more antennas for connecting wirelessly with one or more customer sites.

A customer desiring, for example, access to the Internet will install a set of Customer Premises Equipment (CPE) that includes an antenna and other hardware, as described in detail below, for providing a high speed wireless connection to one or more base stations. Through the high-speed wireless connection, the customer is provided with access to the Internet or to other desired services. As discussed below, the data transmitted wirelessly between a base station and a customer site is termed herein "user data". Of course, at each customer site, a plurality of simultaneous computers can be provided with wireless access to the base station through the use of hubs, bridges and routers.

In one embodiment, the base station comprises a plurality of indoor units that provide an interface between the routers, switches and other base station equipment and a plurality of outdoor units (ODU) that transmit/receive data to/from the customer sites. Each indoor unit typically includes, or communicates with, a modem for modulating/demodulating user data going to/from the outdoor unit.

In one embodiment, each of the indoor units is connected to only one outdoor unit and each IDU/ODU pair transmits and receives user data with a unique frequency. This format provides a base station with, for example, 10, 20, 30 or more IDU/ODU pairs that each communicate with customer sites using unique frequencies. This provides the base station with a means for communicating with many customer sites, yet dividing the bandwidth load between several frequencies. Of course, a base station that serves a small community of customer sites might only have a single IDU/ODU pair.

Each ODU at the base station is normally located outside of the physical building and includes an integrated broadband antenna for transmitting/receiving wireless user data packets to/from the customer sites. Of course, the antenna does not need to be integrated with the ODU, and in one embodiment is located external to the ODU.

The ODU and the IDU communicate with one another through a broadband cable connection, such as provided by an RG-6 cable. In one embodiment the ODU and IDU communicate across about 10 to 100 feet of cable. In another embodiment, the ODU and IDU communicate across about 100 to 500 feet of cable. In yet another embodiment, the ODU and the IDU communicate across about 500 to 1000 feet of cable.

In one embodiment, the IDU controls functions within the ODU by sending control messages in addition to the user data stream. The IDU passes messages to the ODU in order for the IDU to control certain aspects of the ODU's performance. For example, the IDU may determine that the system needs to be tuned in order to maximize the signal strength of the user data being received. The IDU will send a control message in the form of a frequency shift key (FSK) modulated signal, as described below, to the ODU along the broadband cable. The control message preferably includes the identity of a variable voltage attenuator (VVA) or other type of attenuator in the ODU and a new setting for the designated VVA. An onboard micro controller in the ODU reads and interprets the control message coming from the IDU and sends the proper signals to the designated VVA.

Once the ODU has adjusted the designated VVA, the micro controller in the ODU sends a response in the form of a response message back along the broadband cable to the IDU. The response message preferably includes a confirmation of the new VVA setting, or other data to confirm that the requested control message has been fulfilled. The following discussion provides a detailed listing and the structure of exemplary control messages and response messages that can be transmitted between the IDU and the ODU.

The ODU in a CPE preferably samples its transmit detectors only during a transmission to the base station i.e. during an uplink. Fortunately, the ODU knows when it is transmitting user data, so it can accurately sample transmit detectors during an ODU transmission.

In addition to sampling its transmit detectors, the ODU needs to sample its receive detectors to tune the ODU to optimally receive the signal from the base station.

Of course, the ODU should only sample the receive detectors during a transmission from the base station i.e. during a downlink. Unfortunately, in a TDD system there are transmissions at the same frequency from other customer premises ODUs directed to the base station. Because both the uplink transmissions and the downlink transmissions are on the same frequency in a TDD system, the customer premises ODU cannot continuously monitor downlink signals because the ODU might receive a transmission from a nearby CPE that is at a higher signal strength than the ODU receives from the base station. If this happened, the ODU might improperly intercept the transmission from a nearby CPE and proceed to sample its receive detectors at a time other than during transmission from the base station.

As described in detail below, embodiments of the invention include communication systems that only sample receive detectors in the ODU during times that are known to be during a downlink from the base station to the CPE. These embodiments send regular control messages from the IDU to the ODU that request detector values that are measured at a guaranteed downlink transmission time within the TDD frame. By only sampling the receive detectors during this guaranteed downlink transmission time, the ODU in the customer premises equipment is ensured of reading the base station transmission and not a transmission from a nearby CPE outdoor unit. It should be realized that the base stations and the customer sites each have indoor units and outdoor units that function similarly to provide a communication link between the external antenna and the electronic systems in the interior of the buildings. Of course, in one embodiment within the customer sites, the indoor units are connected through routers, bridges, Asynchronous Transfer Mode (ATM) switches and the like to the customer's computer systems, which can also include telecommunication systems. In contrast, within the base stations the indoor units are connected to the routers, switches and systems that provide access to the services desired by the customers.

Referring now to FIG. 1, a wireless communication system 100 comprises a plurality of cells 102. Each cell 102 contains an associated cell site 104 which primarily includes a base station 106 having at least one base station indoor unit (not shown). The base station receives and transmits wireless user data through a set of base station outdoor units 107. A communication link transfers control signals and user data between the base station indoor unit (IDU) and the base station outdoor unit (ODU). The communication protocols between the base station IDU and base station ODU will be discussed more thoroughly in the following sections.

Each cell 102 within the wireless communication system 100 provides wireless connectivity between the cell's base station 106 and a plurality of customer premises equipment (CPE) located at fixed customer sites 112 throughout the coverage area of the cell 102. The customer premises equipment normally includes at least one indoor unit (not shown) and one customer ODU 110. Users of the system 100 can be both residential and business customers. Each cell can service approximately 1,000 residential subscribers and approximately 300 business subscribers. As will be discussed below, each customer ODU 110 is positioned to receive and transmit user data from and to one of the base station ODUs 107. As discussed above, the customer IDU (not shown) is located within the site 112 and provides a link between the customer's computer systems to the ODU.

As shown in FIG. 1, the cell sites 104 communicate with a communications hub 114 using a communication link or "back haul" 116. The back haul 116 preferably comprises either a fiber-optic cable, a microwave link or other dedicated high throughput connection. In one embodiment the communications hub 114 provides a data router 118 to interface the wireless communications network with the Internet. In addition, a telephone company switch 120 preferably connects with the communications hub 114 to provide access to the public telephone network. This provides wireless telephone access to the public telephone network by the customers. Also, the communications hub 114 preferably provides network management systems 121 and software that control, monitor and manage the communication system 100.

The wireless communication of user data between the base station ODUs 107 and customer ODU 110 within a cell 102 is advantageously bidirectional in nature. Information flows in both directions between the base station ODUs 107 and the plurality of Customer ODU 110. Each of the base station ODUs 107 preferably broadcast single simultaneous high bit-rate channels. Each channel comprises different multiplexed information streams. The information in a stream includes address information which enables a selected Customer ODU 110 to distinguish and extract the information intended for it.

The wireless communication system 100 of FIG. 1 also provides true "bandwidth-on-demand" to the plurality of Customer ODU 110. Thus, the quality of the services available to customers using the system 100 is variable and selectable. The amount of bandwidth dedicated for a given service is determined by the information rate required by that service. For example, a video conferencing service requires a great deal of bandwidth with a well controlled delivery latency. In contrast, certain types of data services are often idle (which then require zero bandwidth) and are relatively insensitive to delay variations when active. One mechanism for providing an adaptive bandwidth in a wireless communication system is described in U.S. Pat. No. 6,016,211 issued on Jan. 18, 2000, the disclosure of which is hereby incorporated by reference in its entirety.

1. Cell Site

Figure 2:
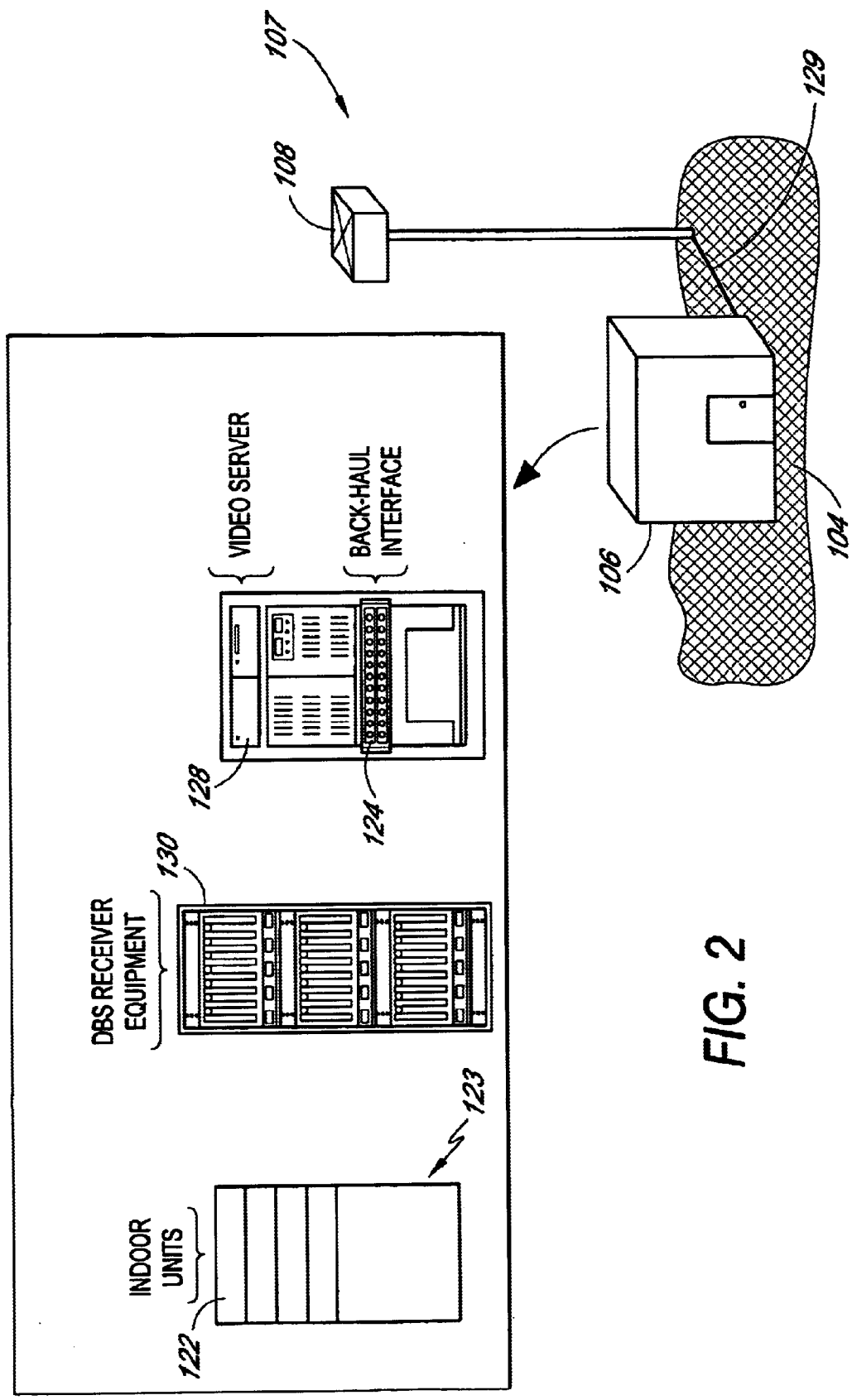
FIG. 2 is a block diagram of cell site used in the wireless communication system of FIG. 1.

FIG. 2 illustrates a block diagram of the cell site 104 of FIG. 1 used in the wireless communication system 100. As described above, the cell site 104 comprises the base station 106 linked to a plurality of base station ODUs 107. As shown in FIG. 2, the base station also includes a series of base station indoor units 123, made up of individual base station indoor units such as indoor unit 122. Each of the indoor units 123 is linked through a broadband cable to an individual ODU. For example, the indoor unit 122 is linked through a broadband cable 129 to an ODU 108. The indoor unit 122 sends control messages and user data to the ODU 108 through the cable 129. The indoor unit 122 also receives response messages and user data from the base station outdoor unit 108. The indoor units 123 are provided with an interface to a back-haul, for example the back-haul interface equipment 124.

The base station can also alternatively include a video server 128 and direct broadcast satellite (DBS) receiver equipment 130. The back-haul interface equipment 124 allows the base station to bi-directionally communicate with the hub 114 (FIG. 1).

The base station 106 is preferably modular in design. The modular design of the base station 106 allows the installation of lower capacity systems that can be upgraded in the field as capacity needs dictate. The IDU 122 in conjunction with the ODU 108 performs both the media access protocol layer and the modulation/de-modulation functions that facilitate high-speed communication over the wireless link. The IDU 122 preferably is connected via the broadband cable 129 to the base station outdoor unit 108 which is preferably mounted on a tower or a pole proximate the base station 106. The base station outdoor unit 108 contains high-frequency radio electronics (not shown) and antenna elements for transmitting user data to the customer sites.

2. Indoor Unit

Figure 3:
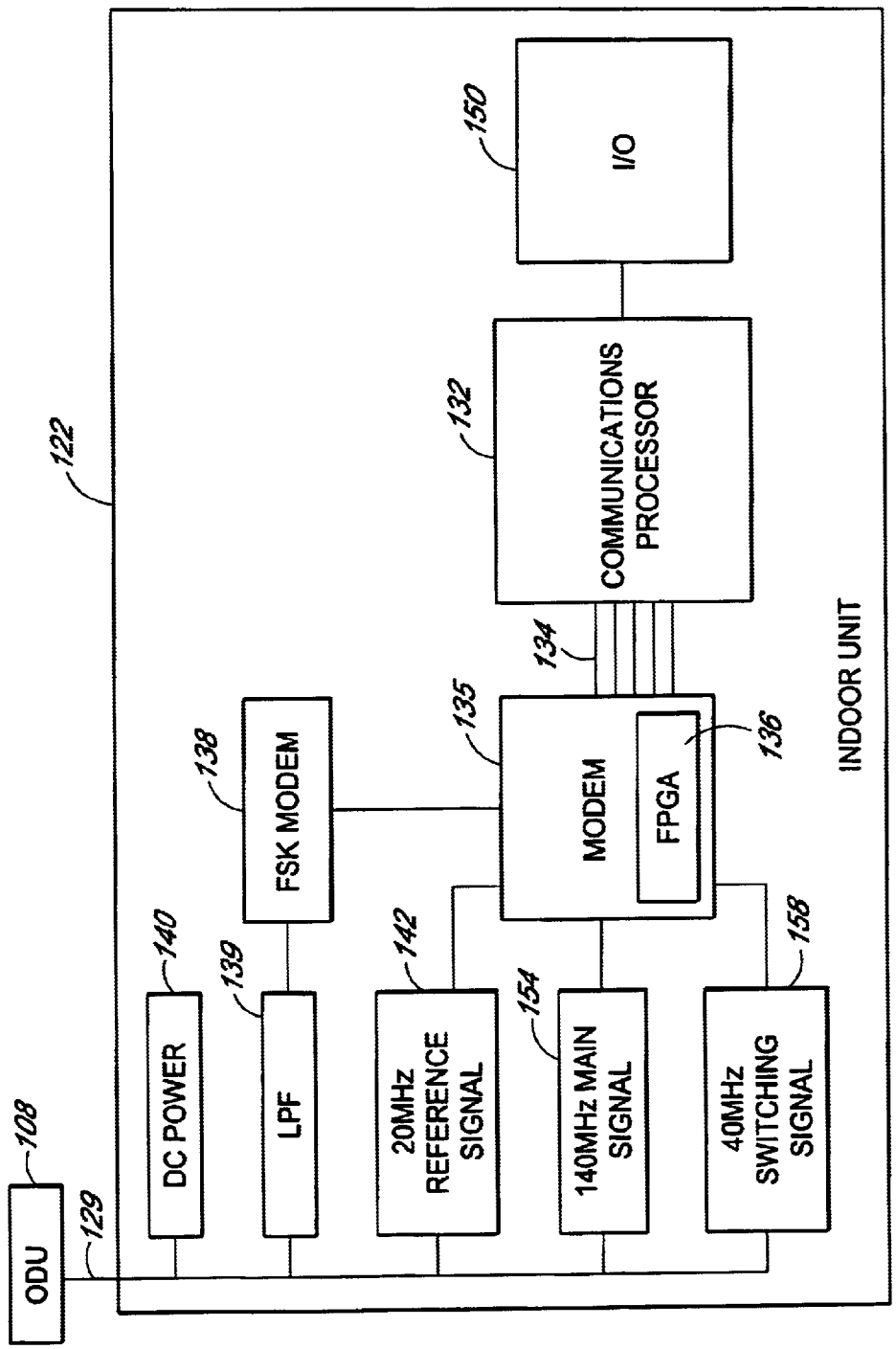
FIG. 3 is a block diagram of an embodiment of an Indoor Unit module from the cell site illustrated in FIG. 2.

Referring to FIG. 3, a more detailed block diagram of the indoor unit 122 is provided. As illustrated, the indoor unit 122 links the base station equipment 124, 126, 128, and 130 to the base station outdoor unit 108. The IDU 122 is preferably under the control of a communications processor 132. One processor is the Motorola MPC8260 PowerQUICC II (PQII). As illustrated, the communications processor 132 connects through a PowerPC bus 134 to a modem 135.

The modem 135 includes a Field Programmable Gate Array (FPGA) 136 that stores instructions for controlling other subcomponents of the IDU 122. For example, the FPGA 136 communicates with a Frequency Shift Key (FSK) modem 138 in order to send FSK modulated control messages from the EDU through the broadband cable 129, to the outdoor unit 108. A low band pass filter 139 is provided between the cable 129 and the FSK modem 138. In an alternate embodiment, an Application Specific Integrated Circuit (ASIC) replaces the FPGA in order to provide similar functions.

As is discussed in detail below, the IDU and ODU communicate with one another using messages. The IDU sends control messages to the ODU, and the ODU responds with response messages. This communication allows the IDU to request data from ODU detectors, and then send commands instructing the ODU to reset subcomponents in order to be more efficient.

Thus, control messages are FSK modulated and sent from the IDU to the ODU. Similarly, response messages from the ODU to the IDU are demodulated by the FSK modem 138 and then interpreted by instructions with the FPGA 136. These control messages and response messages, and their data structure and format, are discussed in detail below. In one embodiment, the transmission baud rate of the FSK modem 138 is 115 kbps with one start bit, one stop bit and one parity bit. Of course, other data transfer speeds and formats are contemplated to be within the scope of the invention. Moreover, the FSK modem 138 preferably transmits and receives in frequencies between 6–8 MHz.

Messages between the IDU and ODU are preferably transmitted independently of the other signals being passed along the cable 129. In one embodiment, the ODU acts like a slave in that it does not originate messages, but only responds to control messages it receives from the IDU.

As illustrated, power is provided to the ODU through a DC power supply 140 that provides, in one embodiment, 48V DC to the ODU. A 20 MHz reference signal 142 is also transmitted across the cable 129 in order to keep components in the IDU and ODU synchronized with one another.

The communications processor 132 is also linked to an Input/Output port 150 that attaches to the routers, switches and systems within the base station. The communications processor 132 receives packet data from the Input/Output port 150 and transmits it to a modem 153 for modulation demodulation. The modulated data signal is then placed on a 140 MHz main signal 154 for high throughput transmission to the ODU 108. It should be realized that the data transmission along the 140 MHz main signal can occur simultaneously with the control message and response message data that is Frequency Shift Key modulated across the cable 129.

Figure 4:
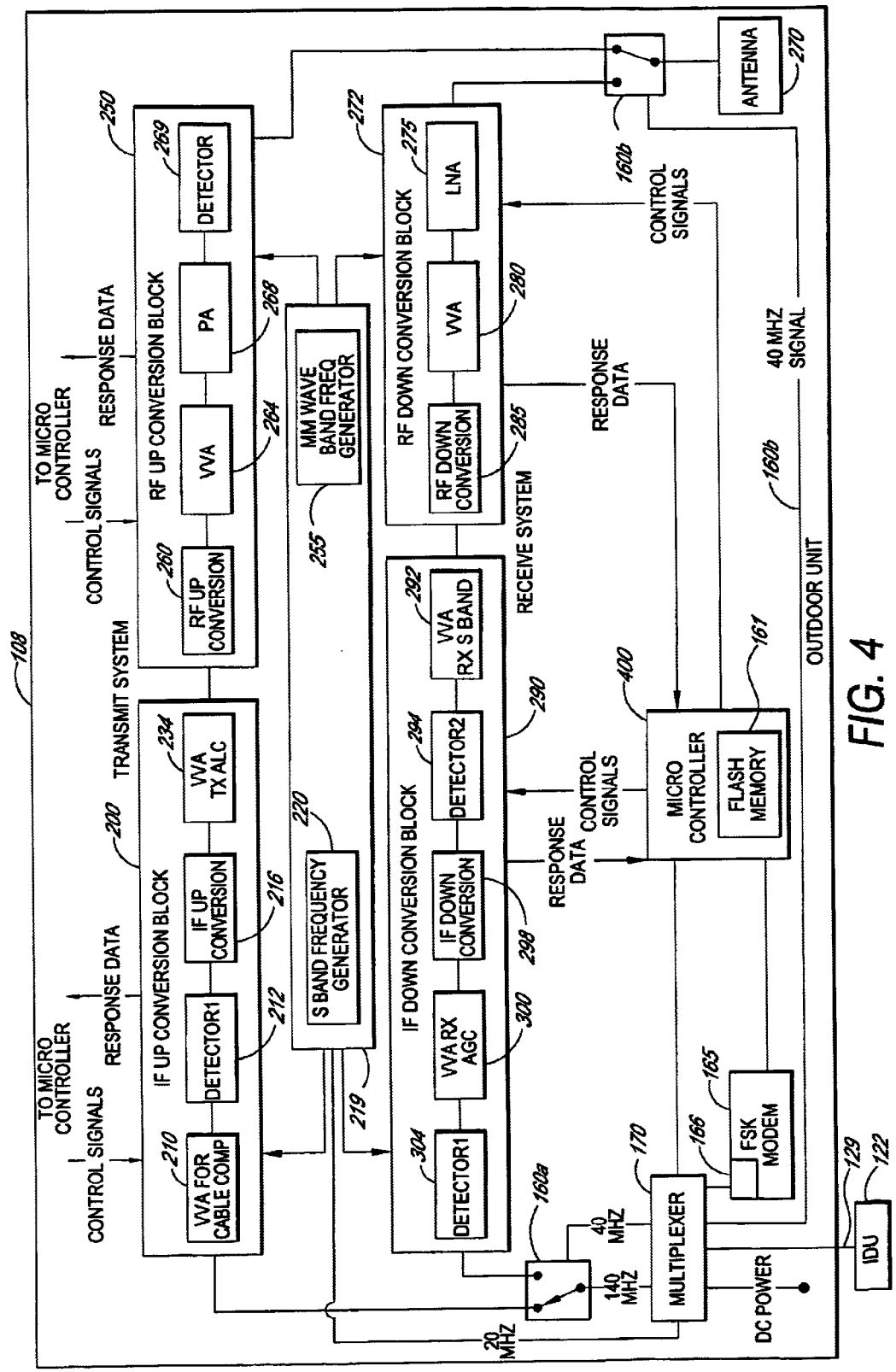
FIG. 4 is a block diagram of an embodiment of an Outdoor Unit module from the cell site illustrated in FIG. 2.

In order for the IDU and ODU to effectively and rapidly switch between receiving and transmitting data modes, a 40 MHz switching signal 158 is also linked to the communications processor 132 and carried on the cable 129. The 40 MHz switching signal 158 is used within the system to switch the ODU and IDU from transmit to receive mode, as will be discussed below with reference to FIG. 4.

In one embodiment, if the 40 MHz signal is present, the ODU and IDU enter transmit mode to send user data from the base station ODU to customer ODUs. However, if the 40 MHz signal is not present, the ODU and IDU enter receive mode wherein user data being transmitted from other ODU's is received by the base station ODU. The timing of the switching signal is controlled by instructions residing in the FPGA 136. For example, in a half-duplex Time Division Duplex architecture, the switching signal 158 is preferably set to switch between receive and transmit modes. However, in a full duplex architecture where user data is constantly being received, the switching signal 158 can be programmed to switch between a transmit mode and a null mode.

3. Outdoor Unit

Still referring to FIG. 3, a more detailed block diagram of the outdoor unit 122 is provided. As illustrated, the outdoor unit 122 receives control messages and user data from the IDU across the cable 129. Depending on the state of the 40 MHz switching signal 142, a set of switches 160a,b in the ODU are either in transmit or receive mode. In transmit mode, user data and control messages are sent from the IDU to the ODU. In receive mode, user data and response messages are sent from the ODU to the IDU. As illustrated, and discussed with reference to FIG. 5, a microcontroller 400 is linked to the components within the ODU in order to manage data flow.

The microcontroller 400 communicates with a multiplexer 170 that separates the signals carried on the cable 129. Within the microcontroller 400 is a programmable memory 161 that stores instructions for gathering the response data and forming response messages for transmission to the IDU. In addition, the instructions within the memory 161 read incoming control messages from the IDU and send control signals to sub-components of the ODU. A FSK modem 165 is connected to the multiplexer 170 and microcontroller 400 for modulating/demodulating messages to/from the IDU. As shown a Universal Asynchronous Receiver/Transmitter (UART) 166 is connected to the modem 165 and receives modulated serial data from the multiplexer 170.

a. Transmit Mode

If the ODU is in transmit mode, the modulated user data being sent from the IDU along the 140 MHz main signal is first routed through the multiplexer 170 to the switch 160a. If the switch is set to transmit mode, the main signal is sent to an IF UP CONVERSION block 200 that converts the 140 MHz signal to an approximately 2.56 GHz (S band) signal. As illustrated, the IF UP CONVERSION block 200 first provides a variable voltage attenuator (VVA) 210 that is used to compensate for frequency fluctuations from transmission along the cable 129. The signal then passes to a detector 212 that measures power levels after compensation at the cable input.

Although the following discussion relates to a system that transmits user data within the millimeter band at frequencies of approximately 28 GHz, the system is not so limited. Embodiments of the system are designed to transmit user data at frequencies, for example, of 10 GHz to 66 GHz.

The user data signal is then up-converted to an S band signal at an IF UP CONVERSION block 216 through an associated local oscillator block 219. The local oscillator block 219 preferably includes an S band frequency generator 220. In one embodiment, the frequency generator 220 includes a National Semiconductor LMX 2301 or Analog Devices ADF41117. The signal is then sent through a second VVA 234 that is used for power adjustment at the S band frequency.

Once the signal has-been up-converted to the S band frequency, it is sent to an RF UP CONVERSION block 250. The RF UP CONVERSION block 250 links to a millimeter wave band frequency generator 255 within the local oscillator block 219 for up-converting the 2.56 GHz signal to an approximately 28 GHz signal. The up-converted signal is then passed through a VVA 264 to provide for millimeter wave band power adjustment. Once the signal has been adjusted by the VVA 264 it is sent to a Power Amplifier 268 and then to an output power detector 269. The signal is then finally passed through the switch 160b and out an antenna 270.

b. Receive Mode

If the ODU is in receive mode, user data is received along a 28 GHz signal (LMDS band) and passed through the antenna 270 and into an RF DOWN CONVERSION BLOCK 272. Within the RF DOWN CONVERSION BLOCK 272 is a Low Noise Amplifier (LNA) 275 which boosts the received 28 GHz signal. The signal is then sent to a VVA 280 for power adjustment at the millimeter wave band after the LNA 275. The received 28 GHz signal is then sent to a RF down converter 285 for down conversion to a 2.56 GHz (S band) signal. The RF down converter 285 communicates with the Local Oscillator block 219 to reduce the incoming signal to the S band range.

After the received signal has been down converted to 2.56 GHz, it is transmitted to an IF DOWN CONVERSION block 290. Within the IF DOWN CONVERSION BLOCK 290 is a VVA 292 for adjusting the power at the S band prior to down conversion. Following adjustment by the VVA 292, the received signal is passed to a detector 294 for measuring power leakage from the transmission path during signal transmission. The signal is then passed to an IF down converter 298 which uses the local oscillator block 219 to down convert the S band signal to a 140 MHz signal for transmission across the cable 129.

After being converted to a 140 MHz signal, the received user data is passed through another VVA 300 for power adjustment at the low frequency band and then a detector 304 to measuring power levels before transmission across the cable 129 (4 dBm at the cable output).

c. Message Traffic Between the ODU and IDU

It should be realized that the control messages sent by the IDU to the ODU can control components of the ODU. For example, in one embodiment, the controlled components in the ODU are the VVAs and frequency synthesizers. Response messages from the ODU to the IDU are also generated to include data from the detectors, temperature sensor and other components described above. As can be imagined, control messages are sent by the IDU and then interpreted by the microcontroller in the ODU. After interpreting the message, the microcontroller sends the appropriate adjustment signals to components of the ODU.

Figure 5:
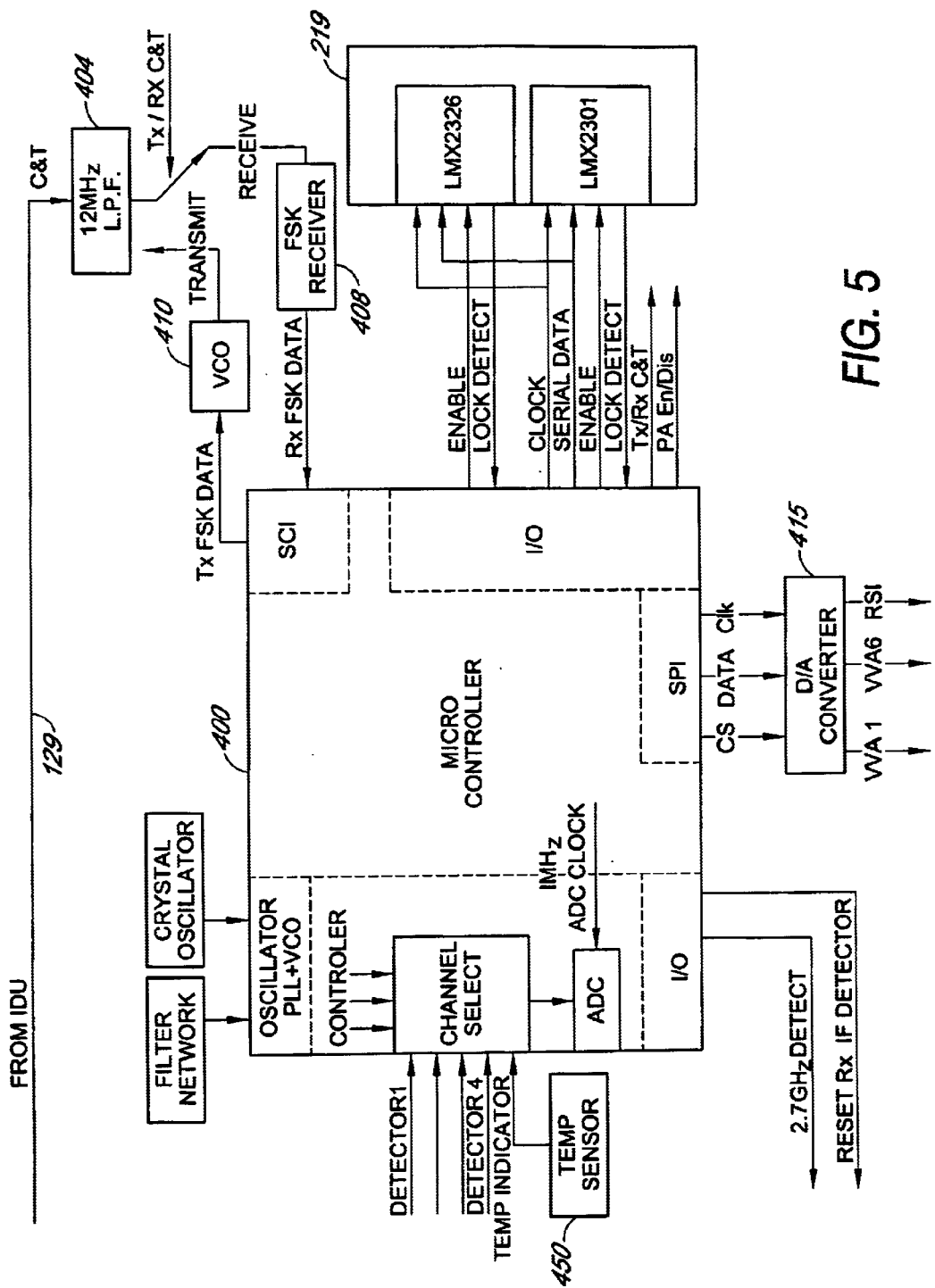
FIG. 5 is a block diagram of an embodiment of the micro controller circuitry within the Outdoor unit.

Referring to FIG. 5, a hardware schematic of circuitry within the ODU is illustrated. As shown, the ODU is controlled by the micro controller 400 that manages data flow within the ODU. In one embodiment, the micro controller is a Motorola MC68HC908GP20 high-performance 8-bit micro controller. Control messages from the IDU are sent across the cable 129 to the micro controller 400 in the ODU and then forwarded to the appropriate ODU component. In addition data signals generated by the ODU components, such as detectors, are sent from the component to the micro controller 400. The micro controller 400 builds a response message that is then transmitted via FSK modulation to the IDU.

As shown in FIG. 5, messages are sent from the IDU along the cable 129 through a 12 Mhz low pass filter 404 to a FSK receiver 408 in the ODU. In one embodiment, the FSK receiver is a Motorola MC13055 FSK receiver. The receiver 408 accepts the FSK modulated data from the IDU and inputs it into the micro controller 400. As also indicated, the micro controller 400 outputs response messages to the IDU through a voltage controller oscillator 410.

The micro controller 400 is also in communication with the local oscillator block 219. In addition a digital to analog (D/A) converter 415 communicates with the micro controller 400 in order to control the VVAs within the ODU. In one embodiment, the D/A converter is an Analog Devices model AD8803 D/A converter.

The micro controller 400 also provides an input from a temperature sensor in order to provide for temperature compensation of the ODU measurements. In one embodiment, the temperature sensor is a National Semiconductor LM50 temperature sensor.

As discussed previously, the IDU transmits FSK modulated control messages to the ODU to control particular components. The structure and format of the control messages sent by the IDU and the response messages returned by the ODU are discussed in detail below.

B. Message Format

In one embodiment, the maximum data rate of FSK modulated messages that can be handled by the Micro Controller is 125 Kbps. However, in another embodiment, and for compatibility with a conventional personal computer, FSK data is transmitted at a 115.2 kbps data rate. Accordingly, the protocol between the Micro Controller 400 and communications processor 124 can be kept as simple as possible and at the same time flexible for future changes. The message structure presented in the following section takes into account this flexible simplicity. In general, the messages passed between the ODU and the IDU are delivered byte after byte with no delay. In one embodiment, in the ODU, a time gap of more then 0.5 msec between bytes will cause the ODU to re-synchronize on the next preamble.

1. Message Structure

In one data format, each message, starts with a fixed preamble that is used to identify the beginning of a message. Following the preamble an identifier is sent. The identifier is unique per message, i.e., a specific identifier defines completely the structure of the following message information fields.

The variable information within each message is preferably sent after the identifier. In addition, a CRC is added at the end of each message as an integrity check of the message. The Micro Controller 400 in the ODU receives a control message from the IDU, controls the required components in the ODU and prepares a response message. As soon as the IDU finishes sending the control message to the ODU, it switches from transmit mode to receive mode. The ODU then begins to transmit FSK modulated response messages to the IDU.

One embodiment of a data structure of the messages is as follows:

| Preamble | Identifier | Information | CRC-8 |
| --- | --- | --- | --- |

Preamble—the preamble is 1 Byte field and it is always 00.

Identifier—the identifier is 1 Byte field and unique for each message.

Information—the information filed is variable length according to the message data being sent. The information field is always padded to be an integer number of bytes.

CRC-8—added for each message for error control. In the IDU, the CRC-8 is implemented inside the FPGA 130 (FIG. 3). The CRC-8 is implemented in software in the ODU Micro Controller 400.

In general, the messages are delivered byte after byte with no delay. When the ODU detects an error, it waits until the next preamble. No response messages are sent back from the ODU to the IDU.

2. Message Traffic

In order to keep the protocol simple, only one control message and one response message are preferably used during normal operation mode. This "MEGA" control message/response message includes all the possible basic control/response messages. Additional control messages are needed for such functions such as software updates and technical information such as IDU, ODU serial numbers and software versions. If new control or response messages are needed in the future, they can be easily implemented by following the data structure represented above. Table 1 lists preferable control/response messages and their unique identifiers.

TABLE 1

Control and Response Messages

| Message | Direction | Identifier |
| --- | --- | --- |
| Master | IDU ⇔ ODU | 0x11 |
| Identify | IDU ⇒ ODU | 0x12 |
| Identity | IDU ⇐ ODU | 0x21 |
| Unexpected Message | IDU ⇐ ODU | 0x22 |
| Set Mode | IDU ⇔ ODU | 0x33 |
| Test Control | IDU ⇒ ODU | 0x34 |
| Download Control | IDU ⇒ ODU | 0x35 |
| Download_Ack Control | IDU ⇐ ODU | 0x53 |
| Tune Control | IDU ⇔ ODU | 0x66 |
| Mega Control | IDU ⇒ ODU | 0x96 |
| Mega Response | IDU ⇐ ODU | 0x69 |
| Mega VVA | IDU ⇒ ODU | 0x97 |
| Mega Det | IDU ⇐ ODU | 0x79 |
| Cal Table Segment | IDU ⇒ ODU | 0x44 |
| Code Segment | IDU ⇒ ODU | 0x55 |
| Segment Received | IDU ⇐ ODU | 0x45 |

In the following tables that describe message data fields, it is assumed that the messages start with a preamble and identifier, and end with an 8 bit CRC that is aligned to be in it's own byte.

a. Master Control Message

The Master control message is used in the initialization state for an IDU to identify itself as a Master IDU. During a master IDU configuration, the CPE preferably monitors the IDU/ODU link for a few milliseconds to determine if there is already a master present. The ODU then responds with the same message.

TABLE 2

Master Control Message

| Field | Bits | Description |
|---|---|---|
| IDU Identifier | 32 | 32 bit identifier of the IDU. Used to distinguish between multiple CPEs in an MDU. | b. Identify Control Message

The Identify control messages has no fields, but is simply the preamble, identifier (0x12), and CRC sent from the IDU to the ODU.

c. Identity ResDonse Message

The Identity response message is the ODU's response to the Identify control message from the IDU.

TABLE 3

Identity Response Message

| Field | Bits | Description |
|---|---|---|
| ODU_Calibrated | 8 | 0x00 ⇒ ODU has not been calibrated<br>0x01 ⇒ ODU has been calibrated |
| MaxTxPow | 8 | Transmission Power level desired minus 45. Accordingly, values from 0 to 255 represent desired values from 45 to 300. |
| MinRxPow | 8 | Minimum Receive Power |
| FrequencyBand | 8 | ODU Frequency Band in GHz<br>24 ⇒ ODU uses 24 GHz Band<br>25 ⇒ ODU uses 25 GHz Band<br>28 ⇒ ODU uses 28 GHz Band<br>31 ⇒ ODU uses 31 GHz Band |
| SW Version | 32 | ASCII Software version number.<br>Example: SW version 135 '0', '1', '3', '5' |
| Flags | 8 | ODU Flags<br>bit 0 (MSB)  Reserved<br>bit 1        Reserved<br>bit 2        Reserved<br>bit 3        Reserved<br>bit 4        Reserved<br>bit 5        Reserved<br>bit 6        Tx MMW detector output is valid<br>    0  No MMW detector<br>    1  MMW detector valid<br>bit 7 (LSB)  AFC Polarity<br>    0  AFC Normal<br>    1  AFC polarity inverted | d. Unexpected Response Message

The Unexpected Response Message is the response to a valid control message which is not expected in the current mode. For example, receipt by the ODU of a Mega Control message during initialization, as could happen after a spontaneous reset of the ODU.

TABLE 4

Unexpected Response Message

| Field | Bits | Description |
|---|---|---|
| Current Mode | 8 | 0x00 = Initialization State<br>0x01 = Normal Mode<br>0x02 = Loopback Mode (obsolete)<br>0x03 = Code Download Mode (obsolete)<br>0x04 = Cal Table Download (obsolete)<br>0x05 = Normal 24 GHz (obsolete)<br>0x06 = ODU Bootstrap Mode<br>0x07 = ODU available for normal operation | e. Set Mode Control Message

The Set Mode control message is used by the IDU to change the state of the ODU. The ODU responds by repeating the Set Mode message to the IDU as a response message.

TABLE 5

Set Mode Control Message

| Field | Bits | Description |
|---|---|---|
| New Mode | 8 | 0x00 = Initialization State<br>0x01 = Normal Mode<br>0x02 = Loopback Mode<br>0x05 = Normal 24 GHz (obsolete)<br>0x06 = ODU Bootstrap Mode<br>0x07 = ODU available for normal operation | f. Test Control Message

The Test Control Message is used by the IDU to instruct the ODU to perform some kind of test operation as described below. The general form of the message is shown in the table below:

TABLE 6

Test Control Message

| Field | Bits | Description |
|---|---|---|
| Operation | 8 | The particular test being commanded |
| Data Byte 1 | 8 | Data pertinent to that command if necessary |
| Data Byte 2 | | | i. Test Control Message—FSK Tone Generation

To conduct testing of the ODU it is useful to have the ODU generate either of the continuous tones corresponding to a 0 or a 1. The format is shown in the table below:

TABLE 7

Test Control Message - FSK tone generation

| Field | Bits | Description |
|---|---|---|
| Operation | 8 | 0x1 ⇒ Transmit FSK Tone |
| FSK_Tone | 8 | 0x0 ⇒ transmit the '0' tone<br>0x1 ⇒ transmit the '1' tone |
| Transmit Time | 8 | Number of seconds to generate the tone (0 . . . 255) |

The FSK tone generation operation causes the ODU to generate either a continuous '0' tone, or '1' tone for the specified number of seconds.

While the tone is being generated the ODU will not respond to control messages since the link is half duplex. When the specified time has elapsed the ODU will resume listening for control messages from the IDU.

ii. Test Control Message—Request Break Status (FSK Cut-off Frequency)

This command determines from the ODU if a "break" character has been detected on the ODU/IDU message interface. The table below shows the format of this message.

TABLE 8

Test Control Message - Request Break Status

| Field | Bits | Description |
|---|---|---|
| Operation | 8 | 0x2 ⇒ Request Break Status |
| Reserved | 8 | |
| Reserved | 8 | |

In virtually all cases, the ODU responds with a Test_Command:Break_Status_Report, indicating if it has detected a "break" character since the last request or not. The message is used to test the ODU FSK receive modem function. A "break" character being detected is the result of the ODU detecting a continuous series of zeros. This can only happen by an external source injecting a pure low tone into the ODU.

The cut-off frequency of ODU receive circuitry can be determined on a test stand by injecting different frequency tones onto the response data interface and repeatedly requesting the ODU detected a "break" character. Eventually a frequency will be reached where the ODU does not detect a break—hence the cut-off can be determined.

iii. Test Control Message—Break Status Report

This message is the response to the Request Break Status and is shown in the table below:

TABLE 9

Test Control Message - Break Status Report

| Field | Bits | Description |
|---|---|---|
| Operation | 8 | 0x3 ⇒ Break Status Report |
| Break_Status | 8 | 0x0 ⇒ No break detected since previous request |
| | | 0x1 ⇒ Break detected since previous request |
| Reserved | 8 | | iv. Test Control Message—Tune test

This message contains the response to the Test Control—Tune Test. It's layout is show below:

TABLE 10

Test Control Message - Tune test

| Field | Bits | Description |
|---|---|---|
| Operation | 8 | Base Frequency in GHz (10–60) 27 => works for 28 GHz ODUs |
| Data Byte | 16 | Frequency offset from base in 100 kHz increments i.e. |
| | | 1 => <Base Frequency> .0001 GHz |
| | | 1000 => <Base Frequency> .1000 GHz |
| | | 10000 => <Base Frequency+1> .0000 GHz |

The Tune test message attempts to tune the ODU to the specified frequency without regard to the valid frequency range for the ODU, therefore tuning outside of the normal range is permitted. The step resolution of the command is 100 kHz. No range checking is performed so specifying values too far beyond the valid range may have unpredictable results. The ODU may not be able to tune to the precise frequency specified, when this occurs it tunes to the nearest frequency it can.

g. Tune Control Message

The Tune Control instructs the ODU to tune to a given frequency specified in units of 100 kHz. The ODU responds after performing the tuning operation by echoing the same Tune Control message back to the IDU and reporting the frequency to which the ODU is now tuned. If the specified frequency is outside the valid frequency range for the ODU, the ODU does not retune. Therefore specifying a frequency of 0 is a mechanism for querying the ODU as to the frequency to which it is tuned without changing the frequency.

The frequencies of 1 and 4294967295 (or FFFFFFFF hex) are reserved as special query-mode frequencies. If the ODU is told to tune to 0.0001 GHz, the ODU will not retune but will respond with the minimum available frequency. For instance, a 28 GHz ODU would return the number 272000. If the ODU is told to tune to 429496.7295 GHz, it will not retune but will respond with the maximum available frequency, or 286500 for a 28 GHz ODU.

TABLE 11

Tune Control Message

| Field | Bits | Description |
|---|---|---|
| Frequency | 32 | The frequency in units of 100 kHz Eg. 28 GHz => 280,000 28.0001 GHz => 280,001 |

The ODU may not be able to tune to the precise in-band frequency specified, when this occurs it truncates the value to the nearest possible frequency and tunes to that frequency instead.

24 GHz ODUs can be commanded to tune from 24.0000 GHz to 25.5000 GHz.

25 GHz ODUs can be commanded to tune from 25.0000 GHz to 25.5000 GHz.

28 GHz ODUs can be commanded to tune from 27.2000 GHz to 28.6500 GHz.

31 GHz ODUs can be commanded to tune from 29.8000 GHz to 31.5000 GHz.

h. Mega Control Message

The Mega Control is used by the IDU to instruct the ODU to change the values of Attenuators or the Frequency.

TABLE 12

Mega Control

| Field | Bits | Description |
|---|---|---|
| Change Flags | 5 | 1 bit per field that may change |
| | | b10000 ⇒ Enable/Disable PA changed |
| | | b01000 ⇒ Rx Power Level changed |
| | | b00100 ⇒ Tx IF1 VVA changed |
| | | b00010 ⇒ Tx Power Level changed |
| | | OR values to get combinations of fields changed For Example, |
| | | b01010 ⇒ Rx Power Level and Tx Power Level both changed. |
| Enable/ Disable PA | 1 | 1 = use 40 MHz switching signal 0 = disable PA |
| Rx Power Level | 10 | Per Rx VVA Table in section 1.2 of [1]. |
| Tx IF1 VVA | 8 | 0 to −30.5 dB in 0.2 dB steps |
| Tx Power Level | 9 | 0 to −60 dB in 0.2 dB steps |
| LinkAcquired | 1 | 1 ⇒ Link is acquired. The ODU reports the value of the |

TABLE 12-continued

Mega Control

| Field | Bits | Description |
|---|---|---|
| | | RxIF1 the detector 10 used immediately following the start of the frame (corresponding to the arrival of the second byte of the Mega Control). The RSL output behaves normally, but with a minimum level of 0.5 volts 0 ⇒ Link is not acquired. The ODU reports the value of the RxIF1 detector from the time period between any previous command and the current Mega Control. The RSL output is always 0 volts. |
| Padding | 14 | For byte alignment of CRC | i. Mega Response Message

The Mega Response message is the response to the Mega Control message.

TABLE 13

Mega Response Message

| Field | Bits | Description |
|---|---|---|
| Rx IF1 Detector | 8 | Temperature compensated and converted to the range −11 to 12 dBm, expressed in 0.2 dBm steps. |
| Rx IF2 Detector or Output Power Detector | 8 | Temperature compensated and converted to the range 5 dBm to 22 dBm, expressed in 0.2 dBm steps. |
| Tx IF1 Detector | 8 | Temperature compensated and converted to the range −26 to −4 dBm, expressed in 0.2 dBm steps. |
| Tx IF2 Detector | 8 | Temperature compensated and converted to the range −5 to −39 dBm, expressed in 0.2 dBm steps. |
| Temperature | 8 | −35 to 85° C. |
| Pad | 5 | For byte alignment of CRC. Can add additional alarms here in the future. |
| Ref PLL Lock | 1 | Alarm: 1 = fail |
| Syn Lock | 1 | Alarm: 1 = fail |
| 2.7 GHz Detect | 1 | Alarm: 1 = fail | j. Mega VVA Control Message

The Mega VVA Control is used by the IDU to instruct the ODU to change the values of Attenuators and the Frequency. Unlike the Mega Control message, it contains the explicit VVA settings.

TABLE 14

Mega VVA Control Message

| Field | Bits | Description |
|---|---|---|
| Rx IF1 VVA | 8 | Explicit value to set Rx IF1 VVA |
| Rx IF2 VVA | 8 | Explicit value to set Rx IF2 VVA |
| Rx MM VVA | 8 | Explicit value to set Rx MM VVA |
| Tx IF1 VVA | 8 | Explicit value to set Tx IF1 VVA |
| Tx IF2 VVA | 8 | Explicit value to set Tx IF2 VVA |
| Tx MM VVA | 8 | Explicit value to set Tx MM VVA |
| Padding | 10 | |
| Change Flags | 6 | 1 bit per field that may change b100000 ⇒ Rx IF1 VVA changed b010000 ⇒ Rx IF2 VVA changed b001000 ⇒ Rx MM VVA changed b000100 ⇒ Tx IF1 VVA changed b000010 ⇒ Tx IF2 VVA changed b000001 ⇒ Tx MM VVA changed |

TABLE 14-continued

Mega VVA Control Message

| Field | Bits | Description |
|---|---|---|
| | | OR values to get combinations of fields changed For example, b010100 ⇒ Rx IF2 VVA and Tx IF1 VVA values have both changed | k. Mega Det Message

The Mega Det message is the response to the Mega VVA control.

TABLE 15

Mega Det Message

| Field | Bits | Description |
|---|---|---|
| Rx IF1 Detector | 8 | Actual detector value. |
| Rx IF2 Detector | 8 | Actual detector value. |
| Tx IF1 Detector | 8 | Actual detector value. |
| Tx IF2 Detector | 8 | Actual detector value. |
| Temperature | 8 | Actual detector value. |
| Pad | 5 | For byte alignment of CRC. |
| Ref PLL Lock | 1 | Alarm: 1 = fail |
| Syn Lock | 1 | Alarm: 1 = fail |
| 2.7 GHz Detect | 1 | Alarm: 1 = fail | l. Download Control Message

The Download Control message is used by the IDU to instruct the ODU to perform some kind of test operation. The general form of the message is shown in the table below:

TABLE 16

Download Control Message

| Field | Bits | Description |
|---|---|---|
| Operation | 8 | The particular test being commanded |
| Data Bytes | 88 | Data pertinent to that operation if necessary | i. Download Control Message—Update Block

The ODU maintains a buffer in its internal RAM for accumulating data to be written to flash memory. This is called the ROW buffer, and is preferably 64 bytes in size. It is sub-divided into 8 blocks, each of which is 8 bytes. A block is updated using this Update Block operation. The format of the operation is defined in the table below:

TABLE 17

Download Control Message - Update Block

| Field | Bits | Description |
|---|---|---|
| Operation | 8 | 2 ⇒ Update Block |
| <reserved> | 8 | 0 |
| Offset | 8 | Offset from the start of the ROW buffer where the bytes being sent are to be placed, usually: 0, 8, 16, 24, 32, 40, 48, 56 |
| N_Bytes | 8 | Number of bytes to be copied to the ROW buffer (0 . . . 8) |
| Data_Bytes | 64 | Up to 8 bytes of data to be written sequentially to the ROW buffer | ii. Download Control Message—Write Row

This message initiates an attempt to write the current content of the ROW buffer in the ODU to flash memory. The format of the operation is defined in the table below:

TABLE 18

Download Control Message - Write Row

| Field | Bits | Description |
|---|---|---|
| Operation | 8 | 3 ⇒ Write_Row |
| Flash_Address | 16 | Address in flash memory where the ROW buffer should be written. Must be a multiple of 64, and not be within the area reserved for the Boot_Module. |
| <reserved> | 72 | | iii. Download Control Message—Peek Memory

This message reads up to 4 bytes from the specified address in memory. The format of the operation is defined in the table below:

TABLE 19

Download Control Message - Peek Memory

| Field | Bits | Description |
|---|---|---|
| Operation | 8 | 4 ⇒ Peek Memory |
| Address | 16 | Address in memory from which the bytes are to be retrieved. |
| N_Bytes | 8 | Number of bytes (up to 4 to be retrieved). |
| <reserved> | 64 | | iv. Download Control Message—Software Reset

This message instructs the ODU software to reset. Control is immediately passed through to the address specified in the reset vector. This mimics behavior at power up. There can be a response to this message. If successful, the ODU will behave as is it has just powered on, if not, it will still be in the same state it was before the reset command had been issued. The format of Software$_{13}$ Reset is defined in the table below:

TABLE 20

Download Control Message - Get_Partition_Info

| Field | Bits | Description |
|---|---|---|
| Operation | 8 | 8 ⇒ Software Reset |
| <reserved> | 88 | | v. Download Control Message—Get Partition Info

This message requests partition information on the specified partition number. The ODU responds with a download$_{13}$ ack:partition_info_report message containing the partition information requested. The format of get$_{13}$ partition_info is defined in the table below:

TABLE 21

Download Control Message - Get_Partition_Info

| Field | Bits | Description |
|---|---|---|
| Operation | 8 | 9 ⇒ Get_Partition_Info |
| Partition_number | 8 | The partition number being requested 0 . . . 255 |
| <reserved> | 80 | | vi. Download Control Message—Request CRC

This message requests the ODU to calculate a 16 bit CRC be calculated over the specified range. The IDU uses the request to verify a partition after it has been downloaded. The ODU responds with a download$_{13}$ ack:CRC$_{13}$ Report message containing the calculated CRC. The format of packet is defined in the table below:

TABLE 22

Download Control Message - Request_CRC

| Field | Bits | Description |
|---|---|---|
| Operation | 8 | 12 ⇒ Request_CRC |
| Start Address | 16 | The address to start the 16-bit CRC calculation |
| Length | 16 | The number of bytes to run the check |
| <reserved> | 56 | | vii. Download Control Message—Get Row Buffer Address

This message requests the address of the ODU ROW buffer. It is used by external software manipulating configuration and hardware parameters to retrieve the values of individual parameters from the ROW buffer using the Download:Peek$_{13}$ Memory command as its most primitive operation. The ODU responds with a Download_Ack: Row_Buffer Address packet. The format of Get_Row_Buffer_Address is defined in the table below:

TABLE 23

Download Control Message - Get_Row_Buffer_Address

| Field | Bits | Description |
|---|---|---|
| Operation | 8 | 21 ⇒ Get_Row_Buffer_Address |
| <reserved> | 88 | | m. Download Ack Control Message

This message contains the response from the ODU to download commands that generate a response.

i. Download Ack Control Message—Memory Report

This message is the response to a download:peek_memory command. It returns up to 4 bytes from the specified address in memory. The format of the operation is defined in the table below:

TABLE 24

Download_Ack Control Message - Memory_Report

| Field | Bits | Description |
|---|---|---|
| Operation | 8 | 5 ⇒ Memory Report |
| Address | 16 | Address in memory where these bytes originate. |
| N_Bytes | 8 | Number of bytes present. |
| Data bytes | 32 | |
| <reserved> | 16 | | ii. Download Ack Control Message—Partition Info Report

This message is the response to a download_get_partition$_{13}$ info command. It returns partition information for the partition number requested. The format of partition$_{13}$ info$_{13}$ report is defined in the table below:

TABLE 25

Download_Ack Control Message - Partition_Info_Report

| Field | Bits | Description |
|---|---|---|
| Operation | 8 | 10 ⇒ Partition_Info_Report |
| Partition_number | 8 | The partition number being described 0 . . . 255 |

TABLE 25-continued

Download_Ack Control Message - Partition_Info_Report

| Field | Bits | Description |
|---|---|---|
| Base_Address | 16 | The starting address of the partition 0 - 0xffff |
| Type | 8 | 'O' => Operational Software<br>'C' => Calibration tables<br>'H' => Hardware parameters<br>'B' => Bootstrap module |
| Is_Valid | 8 | 0 => the partition is invalid |
|  | 16 | 1 => the partition is valid |
| Write_Count | 16 | Number of times this partition has been written |
| Version_Number | 8 | A version number indicating the revision of the partition content 0 . . . 255 | iii. Download Ack Control Message—Row Written

This message describes the ODU result of a Download:Write$_{13}$ Row processed by the ODU. Normally a write will succeed and the status below will return 0. If one or more blocks were not updated, or the ODU was unable to write all the blocks to flash memory correctly, it will respond with a status of 1, and the "Bit$_{13}$ Vector" field will indicate which blocks the ODU has. A '1' in a bit position indicates the block is present, a '0' indicates its absence. The remedy to this condition is to resend the missing blocks, and the attempt the write again. The format is shown below:

TABLE 26

Download_Ack Control Message - Row_Written

| Field | Bits | Description |
|---|---|---|
| Operation | 8 | 11 => Row_Written |
| Flash_Address | 16 | the address in flash memory where the write was attempted. |
| Status | 8 | 0 = row was written successfully to flash memory<br>1 = some blocks in the ROW have not been updated, "Bit_Vector" indicates which blocks are missing<br>2 = the write to flash was not successful, the Bit_Vector field indicates which blocks were not written. This can happen as the write count of the ODU flash memory approaches its 100 cycle limit. In an operational system this is indicates that ODU behavior may become erratic.<br>3 = => the flash address is not a legitimate address for the ODU<br>4 = flash contents at "flash_address" already contained the ROW buffer content, no write was performed |
| Bit_Vector | 8 | If status = 1 or 4, bit vector contains a 0 in each bit position where a block is missing. Block offset 0 is the LSB, block offset 56 is the MSB |
| <reserved> | 16 |  | iv. Download Ack Control Message—CRC Report

This message reports a 16 bit CRC calculated by the ODU in response to a previous Download:Request$_{13}$ CRC command. The format of packet is defined in the table below. The ODU includes the starting address and the length to identify the CRC being reported.

TABLE 27

Download_Ack Control Message - CRC_Report

| Field | Bits | Description |
|---|---|---|
| Operation | 8 | 13 => CRC_Report |
| Start_Address | 16 | The address to start the 16-bit CRC calculation |
| Length | 16 | The number of bytes to run the check |
| Reported_Value | 16 | The calculated CRC value |
| <reserved> | 16 |  | v. Download Ack Control Message—Block Updated

This message is in response to a previous Download:Update$_{13}$ Block. The format of the packet is defined in the table below. There are no conditions when an update should not be successful. The only possibility for not receiving a Download$_{13}$ Ack:Block_Updated message is that the ODU did not receive the Download:Update_Block request. The remedy is to re-send the packet.

TABLE 28

Download_Ack Control Message - Block_Updated

| Field | Bits | Description |
|---|---|---|
| Operation | 8 | 14 => Block_Updated |
| <reserved> | 8 | 0 |
| Block_Offset | 8 | Offset from the start of the ROW buffer where the bytes being sent are to be placed, may be one of: 0, 8, 16, 24, 32, 40, 48, 56 |
| N_Bytes | 8 | Number of bytes to be copied to the ROW buffer (0 . . . 7) |
| Status | 8 | 0 = Successfully copied, non-zero an error occurred |
| <reserved> | 32 |  | vi. Download Ack Control Message—Row Buffer Address

This message is the response to the Download:Get_Row_Buffer_Address command. It provides the absolute address of the Row buffer, which is where Calibration and Hardware parameters are maintained at runtime. This enables suitable external software to make temporary changes to the operating values of these parameters and observer their effect on the system, without writing them to flash memory (an operation most often performed when an ODU is being calibrated). The format of the packet is defined in the table below:

TABLE 29

Download_Ack Control Message - Row_Buffer_Address

| Field | Bits | Description |
|---|---|---|
| Operation | 8 | 22 => Row_Buffer_Address |
| Address | 16 | The Address of the Row buffer |
| <reserved> | 72 |  |

3. Error Detection

When the ODU detects an error in the control message, it normally discards the message. Since all control messages that are sent by the IDU are responded to by the ODU, the IDU detects the failure to receive a response message via a timeout.

The IDU, when acting as initiator, sends control messages and then waits for message responses. If the IDU doesn't receive any response messages after, for example, two (2)

milliseconds, it resends the control message again. If it doesn't receive any response messages after sending several control messages in a row, the IDU takes appropriate corrective action.

4. Control of ODU Components

Table 30 summarizes the components that may be controlled in the ODU by the IDU, their characteristics and the number of bits required to set/read their values.

TABLE 30

ODU Elements Controllable from IDU

| Component | Description | Dynamic Range/Bits |
|---|---|---|
| VVA for Cable Comp (210) | 140 MHz VVA used to compensate for cable loss from the IDU. | 0 to −30.5 dB. Controlled via 8 bit word. VVA is controlled in 0.5 dB steps achievable through most of the range of the VVA. |
| Tx IF2 VVA (234) | S-band VVA used to adjust transmit power of the S band frequency. | 0 to −30 dB. Controlled via 7 bit word in 0.5 dB steps. Used in conjunction with Tx RF VVA (264). |
| Tx RF VVA (264) | MM wave band VVA used to adjust transmit power. | 0 to −30 dB. Controlled via 8 bit word in 0.5 dB steps achievable. Used in conjunction with Tx IF2 VVA (234). |
| Rx IF1 VVA (300) | 140 MHz VVA used to adjust receive attenuation prior to transmission along the cable. Used for Automatic Gain Control (AGC). | 0 to −32 dB. Controlled via 8 bit word. Used in conjunction with Rx IF2 VVA (292) and Rx RF VVA per (280). |
| Rx IF2 VVA (292) | S-band VVA used to adjust receive attenuation. Used for such purposes as AGC. | −1 to −27 dB. Controlled via 8 bit word. Used in conjunction with Rx IF1 VVA (300) and Rx RF VVA (280). |
| Rx RF VVA (280) | MM wave band VVA used to adjust receive attenuation, for such purposes as AGC. | 0 to −24 dB. Controlled via 8 bit word. Used in conjunction with Rx IF1 VVA (300) and Rx IF2 VVA (292). |
| Syn Freq (220) | Synthesizer frequency to be used. | 34 possibilities space 25 MHz apart. |
| Syn Ref (308) | Starting point for frequency mapping. This parameter is dependant upon the Syn Ref Parameter. | 0 to 23.75 MHz in 1.25 MHz steps. |
| Enable/ Disable PA (268) | Enables or disables the Power Amplifier, allowing transmission to the ODU with out transmission over the air. (Disable causes the 40 MHz switching signal to be ignored.) Typically used only in test modes. May be necessary during cable loss compensation. | Enabled means use 40 MHz switching signal. Disable means no transmission regardless of state of 40 MHz switching signal. |

Table 31 summarizes the response messages that can be sent from the ODU to the IDU. The bits used to control/read items are not necessarily what will appear in the user data making up the protocol.

TABLE 31

Response Messages

| Response Data | Description | Dynamic Range/Bits |
|---|---|---|
| Rx IF1 Detector (304) | 140 MHz detector located at the output of ODU to cable. This detector can be used to bring this to 4 dBm. | Approximately −11 to 12 dB. Expressed as 8 bit word. |
| Rx IF2 Detector (294) or Output Power Detector (not shown) | S band detector. Can be used to measure Tx power on the Rx path during transmission. Can also be used to determine transmitter saturation points. Optionally the absolute output power at the PA in dBm. | |
| Tx IF1 Detector (212) | 140 MHz detector at cable input to the ODU. Used for cable compensation. | Approximately −4 to −26 dB. Expressed as 8 bit word. |
| Tx IF2 Detector (230) | S band detector. Can be used to determine transmitter saturation points. | |
| Temperature | Temperature detector. | −35 to 85° C. |
| Ref PLL Lock | Lock detect signal from the 100 MHz reference clock. The synthesizer lock time is 200 msec. | High = fail. |
| Syn Lock | Lock detect signal from the channel selection synthesizer. The synthesizer lock time is 1.5 msec. | High = fail. |
| 2.7 GHz Detect | Detects failure of the 2.7 GHz local multiplier. | High = fail. |

C. Initialization of the System

1. Overview

Figure 6:
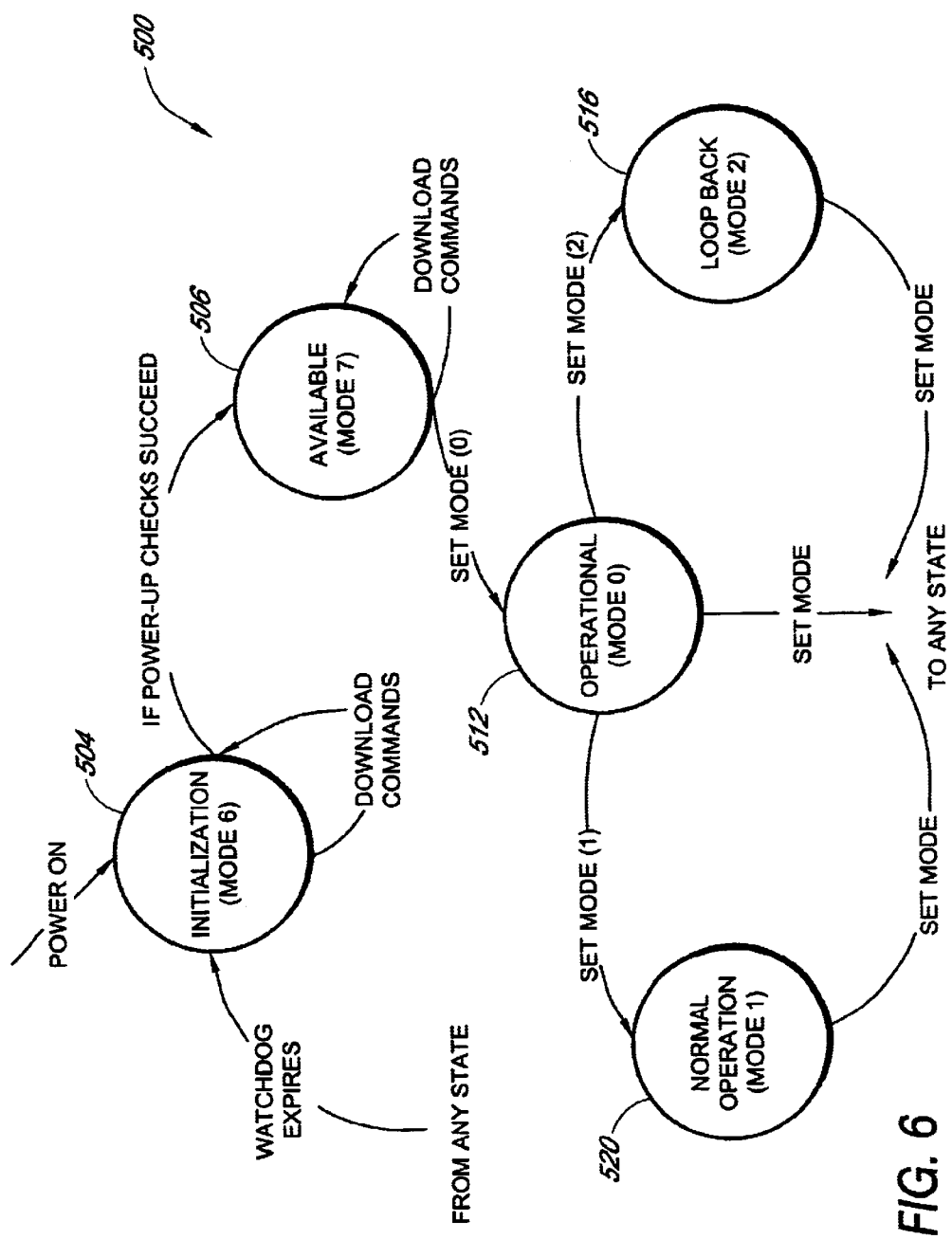
FIG. 6 is a state diagram of one embodiment of the initialization process within an Outdoor unit.

Referring now to FIG. 6, a software state diagram 500 showing the possible modes in which the ODU may operate is illustrated. The initialization process 500 of the Micro Controller in the ODU includes:

Initialization of all I/Os (clock generator, SCI, SPI, A/D etc.)

Reset the local oscillator to inhibit any transmission before being tuned

Determine if the memory partitions for operational software, calibration tables and configuration parameters are valid Determine if memory partitions contents are mutually compatible Establish communications with a master IDU.

On a power-on, or when a watchdog timer expires, the ODU resets and enters a preliminary checkout phase. This phase is explained more completely with reference to FIG. 7. Briefly, all peripherals are reset to a benign state and the ODU places itself in Mode 6 (504). The ODU then automatically attempts to transition itself to Mode 7 (506). This transition entails performing a CRC test on all memory partitions in the ODU to verify that the flash memory is correct and consistent. If it is correct, the initialization procedure in each partition is invoked. This verifies that the content of the memory partition is compatible with the content of any other memory partitions on which it depends. If all memory partitions report compatibility the boot code transition is successful and the system moves to Mode 7, otherwise it remains in Mode 6.

If the process 501 moves to Mode 7, a set$_{13}$ mode command is given by the micro controller and the system initiates normal operation by transitioning the ODU to Mode 0 (512). From Initialization Mode 6, the only valid transition to Mode 0 is through Mode 7, which requires all the previous system tests be successful.

Note that in the State Diagram in FIG. 6, download commands are valid in both Mode 6 and Mode 7 so on power-up, new software can always be downloaded to the ODU even if all memory partitions are invalid.

While in Mode 0, the process 501 can also transition to a loopback Mode 2 (516) and to a normal operational Mode 1 (520). These other Modes are discussed more completely in reference to FIGS. 9 and 10 below.

2. Preliminary Checkout (Mode 6)

Figure 7:
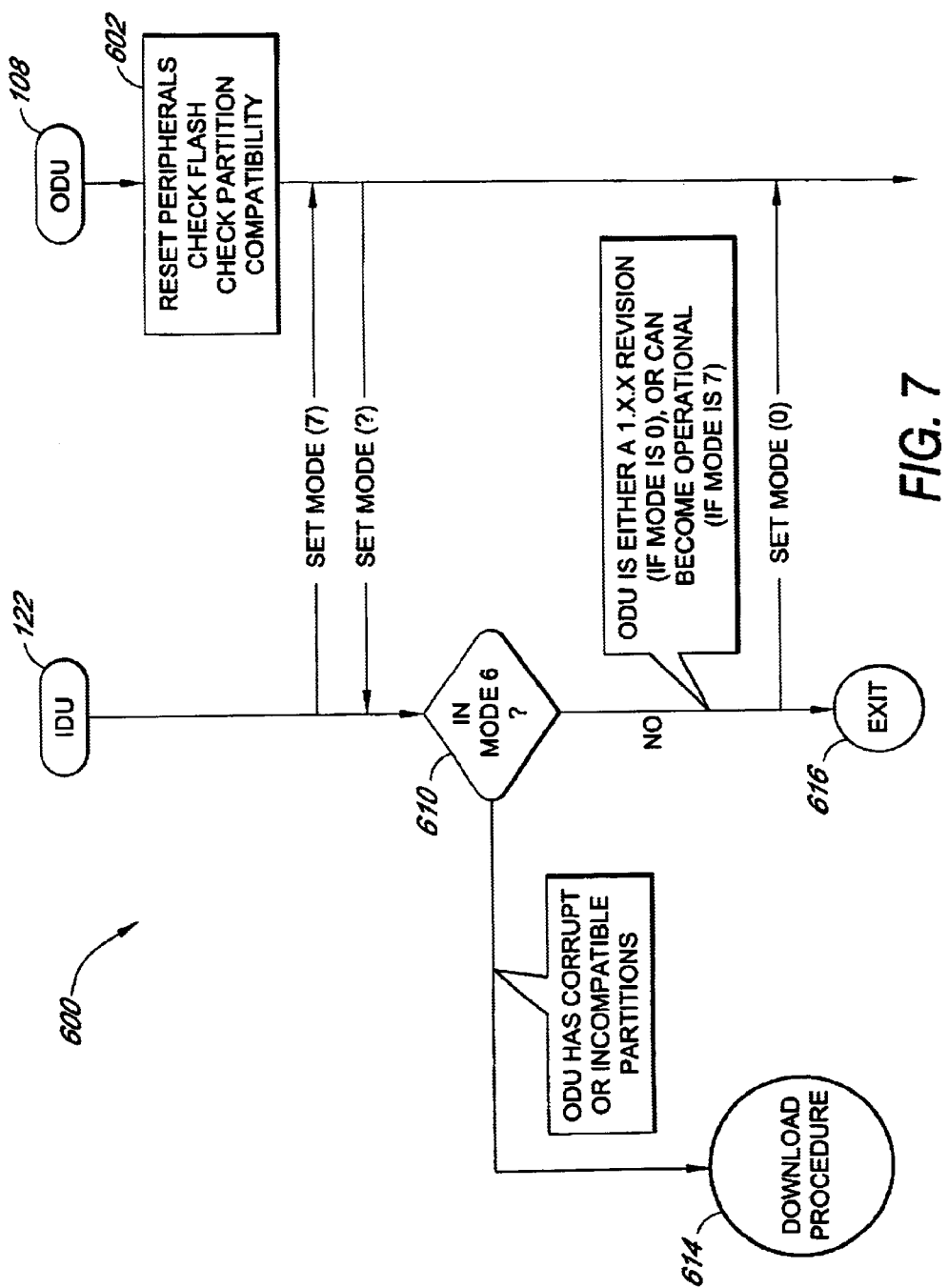
FIG. 7 is a flow diagram of one embodiment of a preliminary checkout process undertaken in the Outdoor unit.

FIG. 7 illustrates the flow of the first interactions between the IDU 122 and ODU 108. A preliminary checkout process 600 begins with the ODU 108 resetting its peripherals, checking its flash memory, and checking its memory partition compatibility at a state 602.

Once this is complete, the IDU 122 sends a $SET_{13}$ MODE (7) control message that attempts to transition the ODU from the checkout mode 6 into Mode 7. The ODU responds with a response message indicating its current mode. A determination of the ODU's current mode is then made by the IDU 122 at a decision state 610. If a determination is made that the ODU is still in Mode 6, and did not transition to Mode 7, the checkout process 600 moves to a state 614 to begin downloading new software to the ODU in an attempt to help the ODU transition to Mode 7.

However, if a determination was made at the decision state 610 that the ODU was not still in Mode 6, the IDU then issues a $SET_{13}$ MODE (0) control message to move the ODU into its operational mode (0). The checkout process 600 then terminates at an end state 616.

When the IDU issues the $SET_{13}$ MODE (0) command, it learns several pieces of information from the response message. If there's no response it indicates thateither the connection to the ODU is faulty or that the ODU is broken in some way. If there is a response, then the state returned in the response message indicates which of the three possible states the ODU is now in. From the response message the IDU can determine if it must perform some remedial action on the ODU (see the download procedure described later), or if it can begin operation.

3. Handshaking Process

Figure 8:
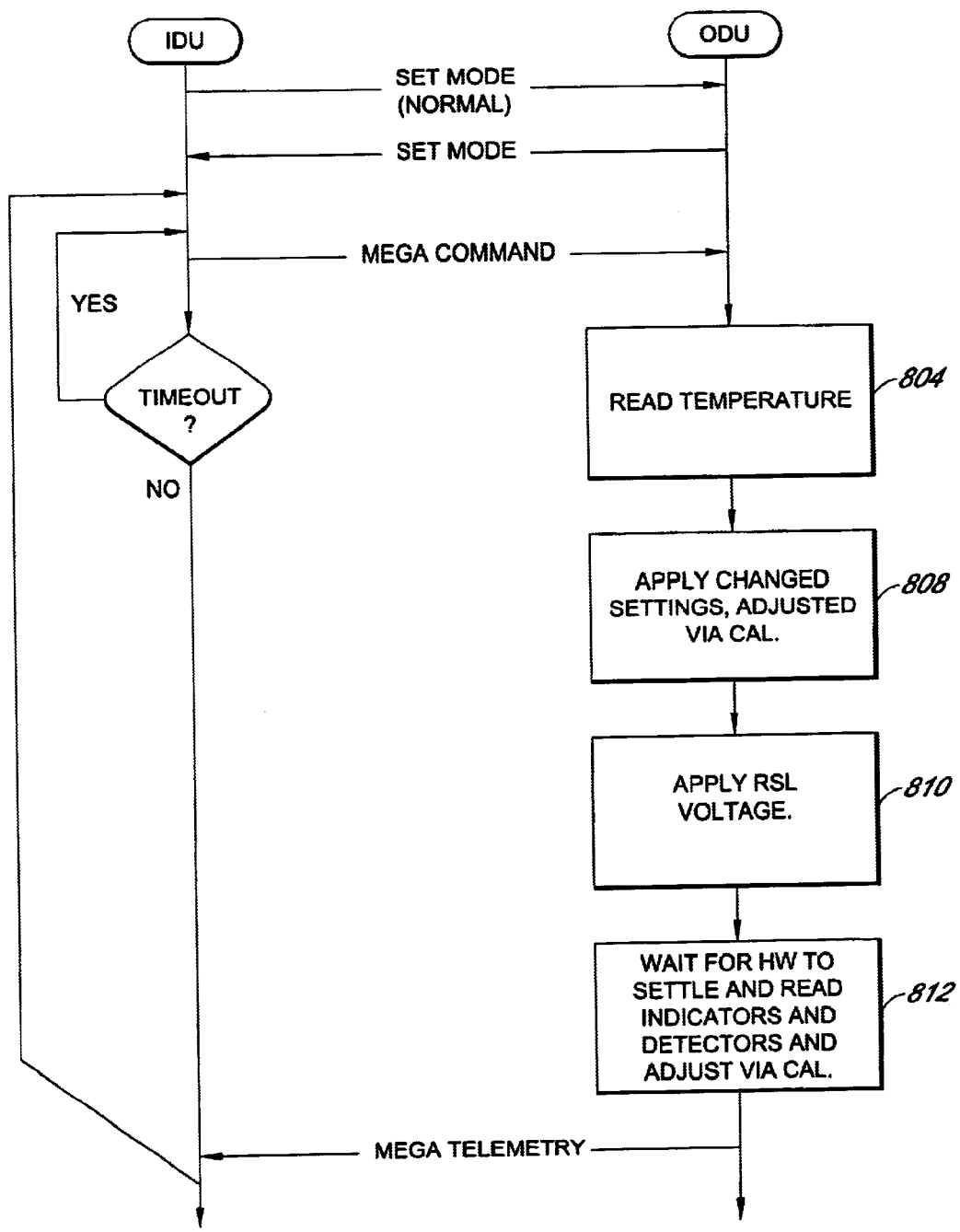
FIG. 8 is a flow diagram of one embodiment of a handshaking process between the Indoor unit and the Outdoor unit.

After the initialization processes of FIGS. 7 are completed (identical for Base Station and CPE), a handshake process 800 begins, as shown in FIG. 8. In the handshake process 800, the Micro Controller in the ODU waits for the first message from the IDU. Because of the complexity of the software in the IDU (whether CPE or base station), the ODU normally finishes initialization before the IDU.

The IDU then issues a $SET_{13}$ MODE (1) control message to transition the ODU into Normal Operational Mode 1. This transition results in the ODU performing the following functions:

Control the following components:
1. Set Receive (Rx) VVAs attenuation to minimum.
2. Set Transmit (Tx) VVAs attenuation to maximum.
3. Set reference frequency (LMX2301) to 100 MHz.
4. Disable the Power Amplifier Measure test points.

Once complete, the process 800 then loops continuously, receiving response messages from the ODU and performing the actions dictated by the control messages from the IDU. The most typical action in this process in the ODU is:

The ODU receives a MEGA command from the IDU with instructions to alter the values of the VVAs or Frequencies in the Frequency synthesizers and:

1. Reads the temperature (State 804).
2. Adjusts the settings received in the MEGA control message for temperature, if necessary and applies the new values (State 808).
3. Calculates and applies the RSL voltage setting (State 810).
4. Reads detector values and adjusts values for temperature via the calibration tables (State 812).
5. Reads the 3 lock/detect indicators.
6. Builds and transmits a mega response message.

4. Reading Detector Values

Figure 9:
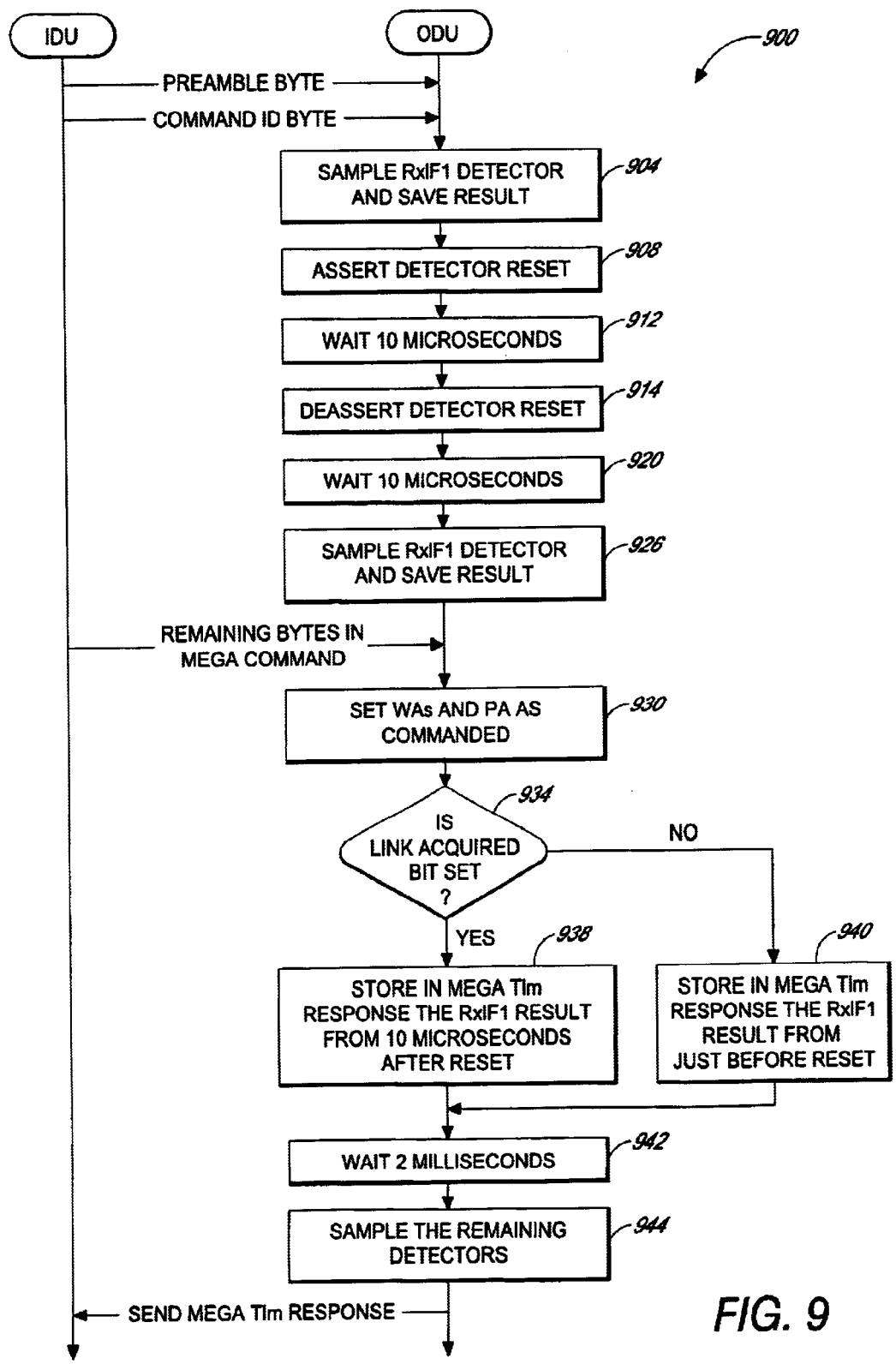
FIG. 9 is a flow diagram of one embodiment of a timing measurement of a detector process undertaken in the Outdoor unit.

As shown in FIG. 9, a process 900 of reading ODU detector values is illustrated. The process 900 begins when the ODU measures the output from the RxIF1 detector 304 (FIG. 4) at a precise instant (state 904) in order to send this value in the Mega Response Message. Every time the ODU receives the byte immediately following the preamble byte, it reads the detector 304 at the state 904 and saves the result. Then it holds the detector in reset for a 10 microseconds at a state 908. The process 900 then de-asserts the reset signal at a state 914 and waits 10 more microseconds at a state 920. The process 900 then samples the RxIF1 detector 304 again at a state 926 and saves the result. The VVAs and Power Amplifier are then set at a state 930 as commanded by the MEGA control message.

A determination is then made at a decision state 934 whether or not the LinkAcquired bit was set in the Mega Control message. If the LinkAcquired bit was set, the ODU reports the measurement taken immediately after the detector reset at a state 938. However, if the LinkAcquired bit was zero, the ODU reports the measurement taken immediately before the detector reset at a state 940.

The process 900 then waits two milliseconds at a state 942 and proceeds to sample any remaining detectors in the ODU at a state 944. The Mega response message is then sent from the ODU to the IDU.

5. Loopback Mode

Figure 10:
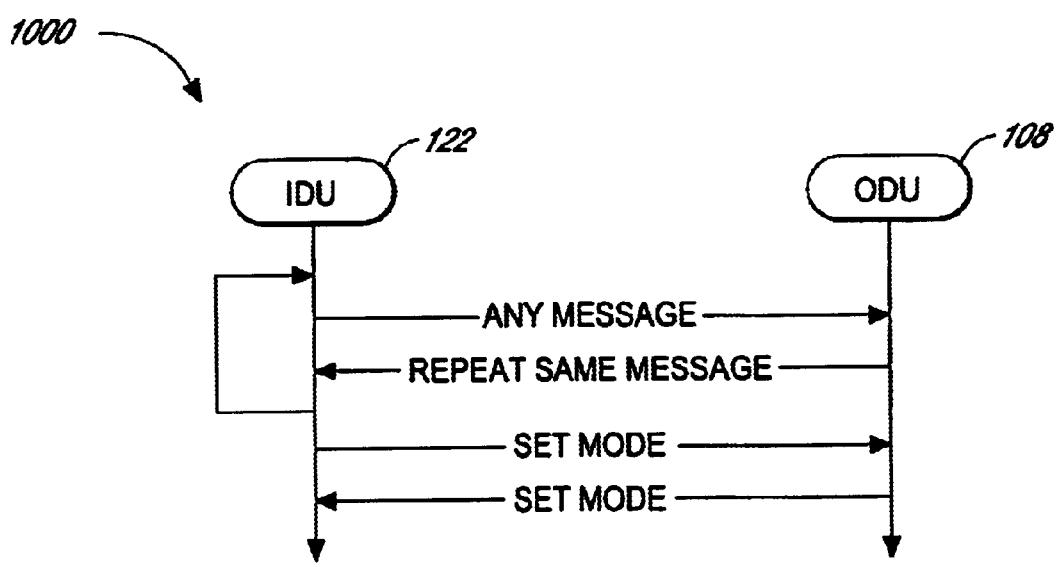
FIG. 10 is a flow diagram of one embodiment of a loopback process undertaken in the Outdoor unit.

In the loopback mode process 1000 illustrated in FIG. 10, the ODU 108 simply repeats back to the IDU 122 whatever message it has received. It leaves the loopback mode when it receives the set mode control message to transition to a different mode. No other work is performed during loopback mode—no reading of control messages or setting of control values. The control messages sent to the ODU by the IDU during loopback mode preferably have a preamble, a CRC, and at most 14 additional bytes. Other than "$set_{13}$ mode" message data which must follow the format described above, the messages sent during loopback mode may be composed of any byte pattern.

6. Customer Premises Equipment

Figure 11:
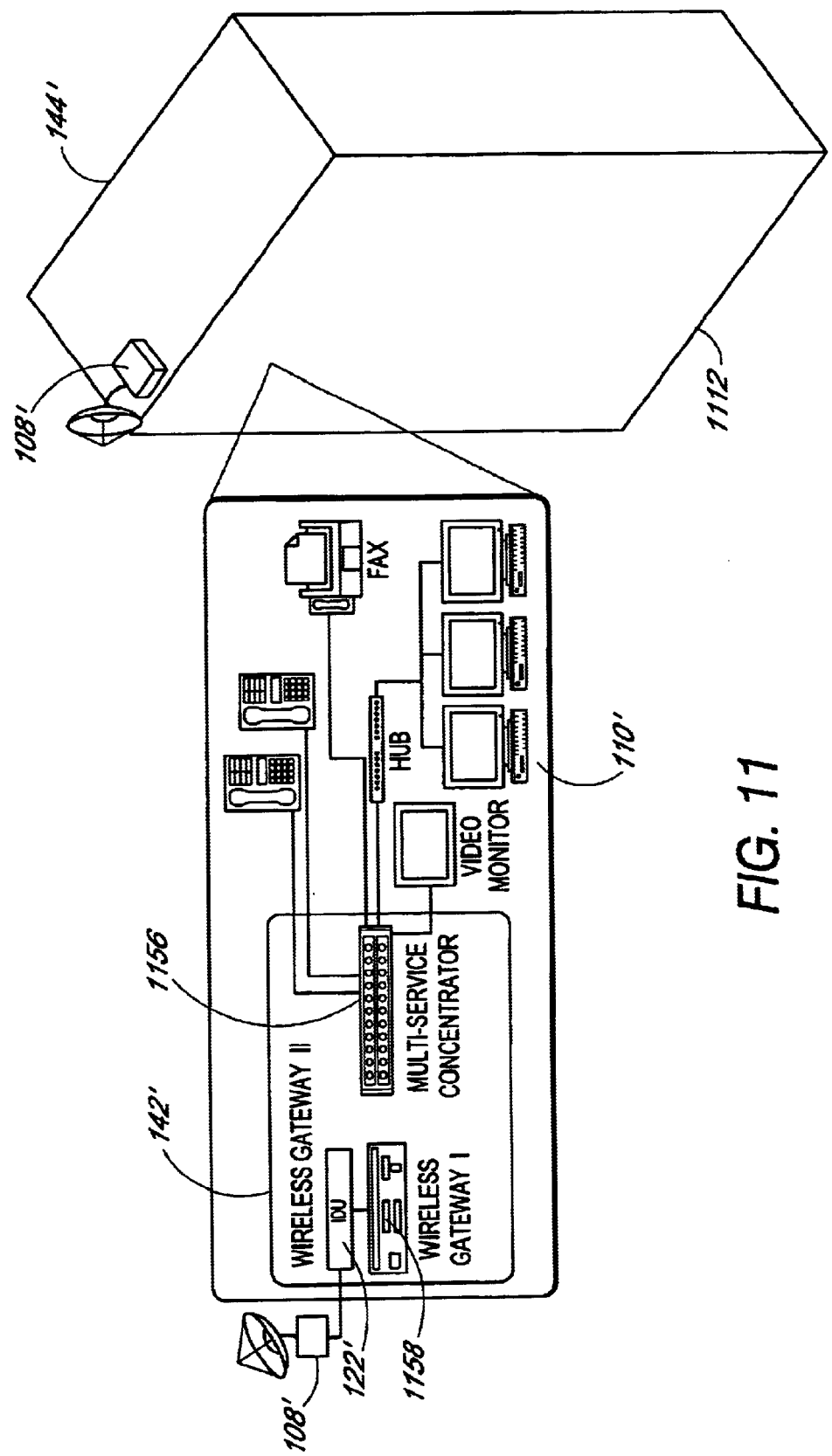
FIG. 11 is a block diagram of a commercial customer site that includes customer premises equipment.
Figure 12:
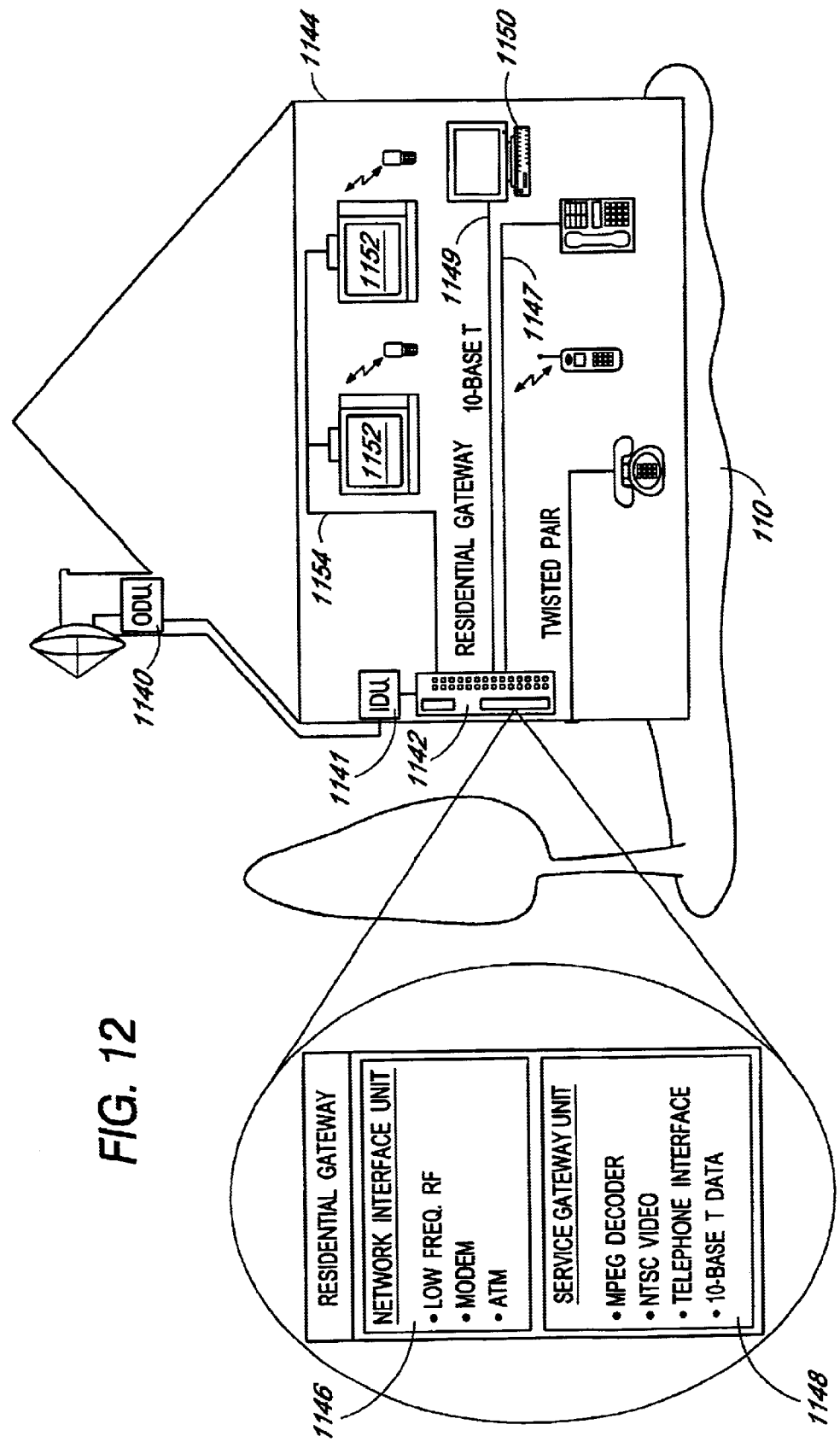
FIG. 12 is a block diagram of a residential customer site that includes customer premises equipment.

Although the previous discussion has focused on IDUs and ODUs that are installed as part of a base station, these devices are similarly installed within each customer site for receiving and transmitting wireless data. As illustrated FIGS. 11 and 12 are block diagrams of the customer premises equipment (CPE) 110 shown in FIG. 1. As described above, the subscribers of the wireless communication system contemplated for use with the present invention may be either residential or business customers. FIG. 12 is a block diagram of a residential CPE 110. FIG. 11 is a block diagram of a business CPE 110.

As shown in FIG. 12, the residential CPE 110 preferably includes an ODU 1140, IDU 1141 and a residential wireless gateway apparatus 1142. The residential gateway 1142 is preferably installed on a side of the residence 1144. The residential gateway 1142 preferably includes a network interface unit (NIU) 1146 and a service gateway unit 1148.

The NIU 1146 performs the functions necessary to allow the residential user to communicate with the wireless communication system, such as performing low frequency RF communication, modem and ATM functions.

The NIU 1146 performs the necessary communication interface functions including airlink and protocol interface functions to allow the residential user access to the network. The service gateway unit 1148 allows the residential user to gain access to the services provided over the communications system.

For example, as shown in FIG. 12, the service gateway unit 1148 preferably includes an MPEG decoder, NTSC video interface, telephone interface and 10-baseT data interface. The residential gateway 1142 interfaces to the various service access points within the residence 1144. The residential gateway 1142 contains the necessary hardware and software for interfacing to the radio communications airlink and for driving various services into the residence 1144. In addition, by interfacing with the telephone wiring 1147 within the residence 1144, the residential gateway 1142 is capable of providing a variety of telephone services to the residence 1144.

Similarly, by interfacing with copper or co-axial wiring 1149 within the residence 1144, the residential gateway 1142 is capable of providing 10-baseT and other data services to equipment 1150 (such as a personal computer depicted in FIG. 12) within the residence 1144. Finally, the residential gateway 1142 can also provide broadcast video and data-centric television services to a plurality of television systems 1152 by interfacing with standard cable television co-axial cabling 1154 in the residence 1144. The residential gateway 1142 is designed in a modular fashion to service multiple data, telephone, and video lines. Thus, a single residential gateway 1142 is sufficiently flexible to accommodate the communication needs of any residential customer.

FIG. 11 is a block diagram of the business CPE 110' of FIG. 1. The business CPE 110' is designed to provision and provide services to a small business customer site 1112. As shown in FIG. 11, the business CPE 110' includes an ODU 108' and IDU 122'. The CPE 110' also includes a business wireless gateway apparatus 142'. The ODU 108' is affixed to a business site building 144' while the business gateway 142' is installed in a wiring closet within the business site building 144'.

The communication interfaces of the business gateway 142' are similar to those of the residential gateway 1142 (FIG. 12). However, the service interfaces of the business gateway 142' differ from those of the residential gateway 1142. The business gateway 142' includes interfaces capable of driving voice and data services typically used by small business customers. These include integrated services digital network (ISDN), local area network (LAN), PBX switching and other standard voice and data services.

As shown in FIG. 11, a "two-box" solution is presently contemplated for implementing the business gateway 142'. An "off-the-shelf" multi-service concentrator 1156 can be used to provide the business user services and to convert the outgoing data into a single transport stream. The business gateway 142' also includes a wireless gateway apparatus 1158 which contains the necessary hardware and software for interfacing to the IDU and for driving various services into the business site building 144'.

Alternatively, the wireless functionality provided by the business gateway 142' can be integrated into the multi-service concentrator 1156 in order to reduce costs and provide a more integrated business gateway solution. Different types of multi-service concentrators 1156 can be used depending upon the size and needs of the business customer. Thus, a network provider can deploy a cost effective solution with sufficient capabilities to meet the business customer's needs.

Various types of services can be provided to the business customer using the CPE 110' of FIG. 11. For example, by providing standard telephone company interfaces to the business customer, the business CPE 110' gives the customer access to telephone services yet only consumes airlink resources when the telephone services are active. Network providers therefore achieve significant improvements in airlink usage efficiency yet are not required to modify or overhaul conventional interfaces with the business customer's equipment (e.g., no changes need to be made to PBX equipment). In addition, the business gateway 142' can support HSSI router and 10-BaseT data interfaces to a corporate LAN thereby providing convenient Internet and wide area network (WAN) connectivity for the business customer. The business gateway 142' will also enable a network provider to provision "frame-relay" data services at the customer's site. The business gateway 142' can support symmetrical interface speeds of 10 Mbps and higher.

Finally, the CPE 110' facilitates the transmission of various types of video services to the business user. The video services primarily includes distance learning and video conferencing. However, in addition, the business CPE 110' can include ISDN BRI interfaces capable of supporting conventional video conferencing equipment. Using these interfaces, the business users will have the option of either viewing or hosting distance learning sessions at the business site building 144'.

D. Measuring Detectors in the ODU

Figure 13:
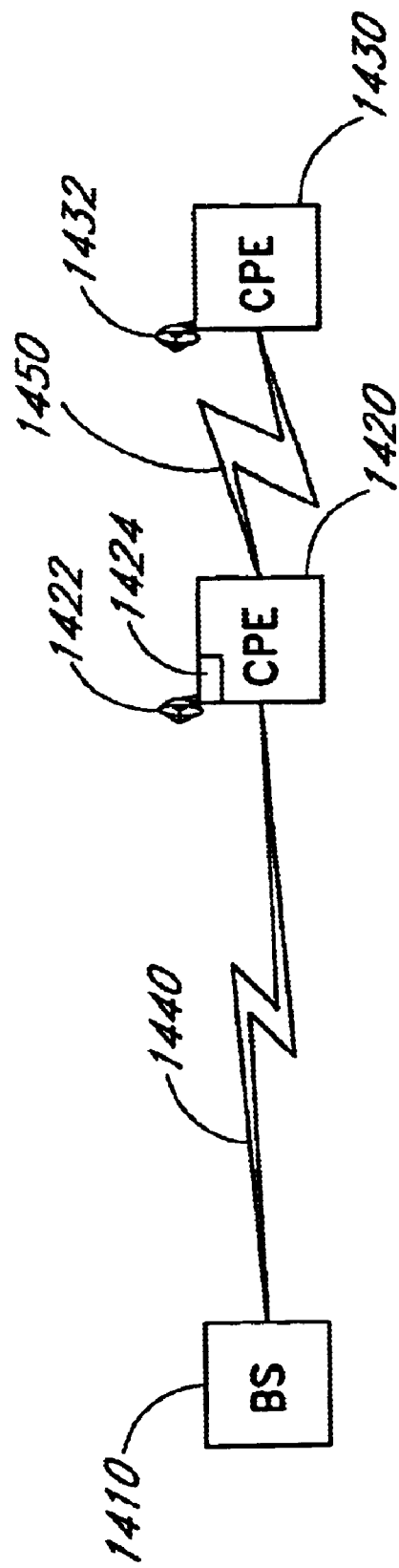
FIG. 13 is a block diagram illustrating one embodiment of communications between base stations and consumer premises equipment in wireless systems.

FIG. 13 illustrates a base station 1410 transmitting user data 1440 to an outdoor unit 1422 of customer premises equipment 1420. As shown, the ODU 1422 is linked to an IDU 1424. The ODU 1422 might also receive transmissions 1450 from a nearby ODU 1432 of CPE 1430. As can be imagined, the transmissions 1450 directed towards the base station 1410 would interfere with power measurements taken by the CPE 1420 in a TDD system. This is due to the fact that in TDD systems the CPEs and base stations transmit using the same frequency.

Due to the proximity of the CPE 1432 to the CPE 1420, the ODU 1422 might receive transmissions from the ODU 1432. This would especially be possible if the signal strength of the transmission 1450 from ODU 1432 is stronger than the signal strength of the transmission 1440 from the base station 1410. For this reason, it is advantageous for the CPE 1420 to only measure power detectors in the receive pathway during a time when only the base station 1410 is transmitting user data.

The communication system uses the known reception time of the Mega Control message to address this problem. Each Mega Control message is timed so that the first byte of the message is received by the ODU at a time that is set aside in each TDD frame for base station downlink transmissions. Thus, when the ODU receives the first byte of the Mega Control message, it can measure the receive path power detectors and be assured that the only transmissions at that time are from a base station.

The system is designed such that under normal operation, a Mega Control Message (see Table 12) is sent along a broadband transmission cable (not shown) from the IDU 1424 to the ODU 1422 via FSK modulated signals. The Mega Control Message, as described above, is used by the IDU to control sub-components, such as VVA's, in the ODU. For this reason, the Mega Control Message is sent repeatedly, very frequently, and for the duration of the normal operation. The ODU responds to the Mega Control Message with the Mega Response Message (see Table 13) that includes settings of the detectors in the ODU.

Figure 14:
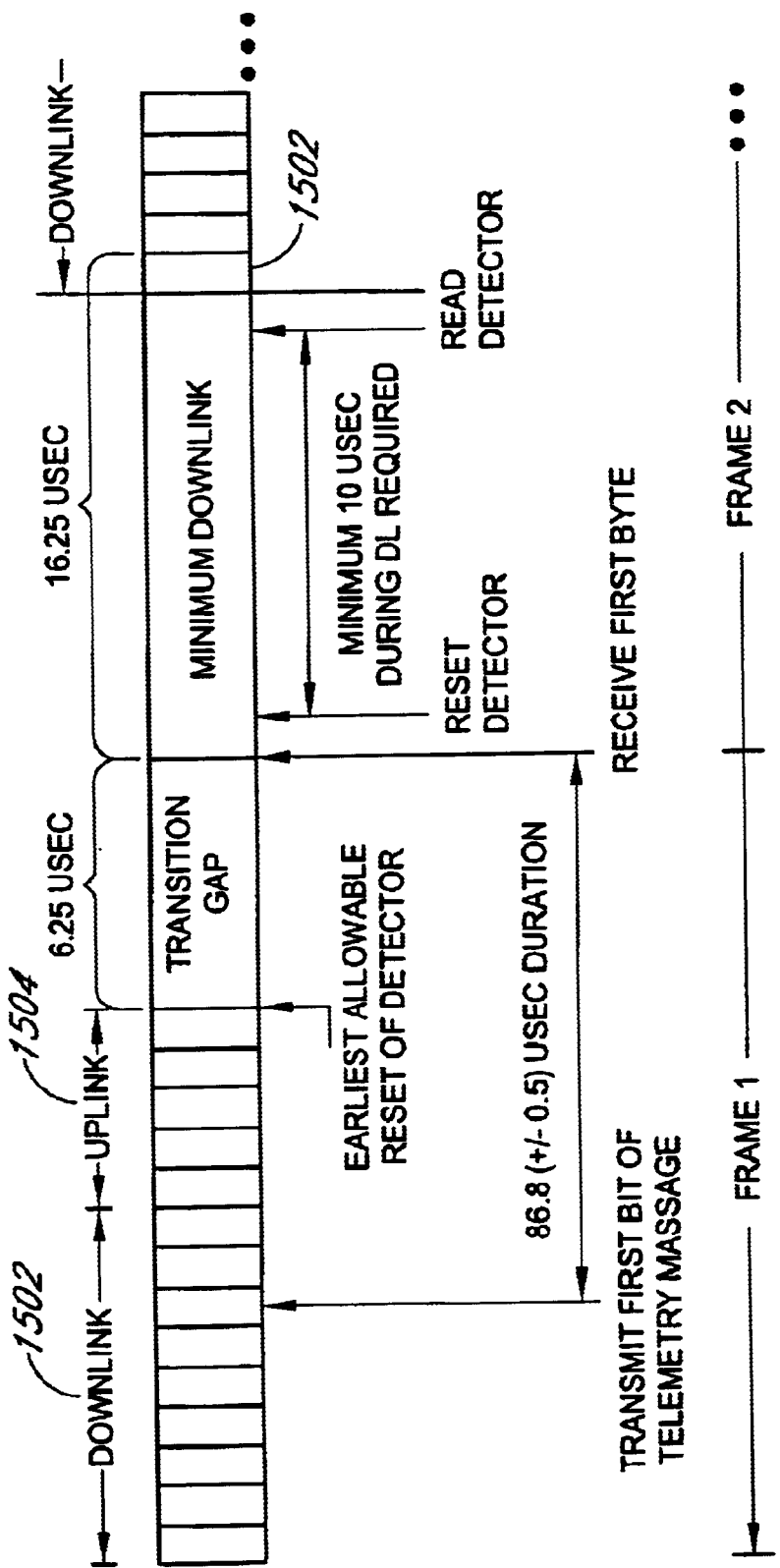
FIG. 14 is a block diagram of a time frame for transmitting wireless user data between a base station and consumer premises equipment.

FIG. 14 illustrates the timing used by the IDU to send Mega Control Messages to the ODU. As shown, a TDD time frame 1500 is divided into a downlink time 1502 and an uplink time 1504. The downlink time and uplink time include a plurality of time slots for transmitting or receiving user data from the CPE to the base station. It should be realized that an adaptive time division duplex system dynamically adjusts the number of time slots allocated to uplink and downlink times to provide the most efficient transfer of user data from the CPEs to the base station. Accordingly, when the base station has a tremendous amount of user data to transmit, the number of time slots in the frame 1500 dedicated to downlinking data from the base station to the CPEs will increase.

As shown in the FIG. 14, at the end of the uplink time 1504 in the frame 1500 is a transition gap of 6.25 microseconds that provides a means for the system to change from an uplink mode to a dedicated downlink time mode. Of course, embodiments of the invention are not limited to systems that provide such a gap. For example, similar systems having no transition gap, or transition gaps of varying times are well within the scope of the invention.

At the front of each frame, and following the previous frame's transition gap, is a dedicated downlink time. In this embodiment, the minimum downlink time lasts 16.25 microseconds. Of course, the invention is not limited to any particular minimum downlink time. The minimum downlink time is used by the system to allow the base station to transmits internal command data to each of the CPEs. This command data, for example, can include the uplink/dowlink times for the next time frame. As discussed herein, the downlink time is only required to be long enough for the detectors to make a measurement from the detectors. Downlink times that are greater or lesser in duration are thus within the scope of the invention.

Thus, during this time only the base station is communicating with each CPE. The CPEs do not transmit during the minimum downlink time since they are receiving their instructions for the next frame. Because each time frame is of a fixed duration in the TDD system, and the minimum downlink time occurs at a fixed place (e.g.: at the end) of the frame in this embodiment, the IDU 1424 in the CPE 1420 knows that power measurements taken by the receive detectors during the minimum downlink time are guaranteed to only measure transmissions from the base station 1410.

In one embodiment of the system the micro controller 400 (FIG. 4) continuously polls the Universal Asynchronous Receiver/Transmitter (UART) 166 associated with the FSK modem 165 to determine when a complete byte of data has been received by the ODU. As discussed previously, under normal operating conditions the only control message being sent from the IDU to the ODU is the Mega Control Message. Accordingly, the ODU can be set to begin taking receive power measurements after the first byte of the message is received in the UART 166 from the IDU. By knowing the amount of time it takes the ODU to receive one byte of a message from the IDU, the IDU can be programmed to always begin transmitting the Mega Control Message so that the ODU will receive the first byte of the message at the beginning of each 16.25 microsecond downlink time within every TDD frame.

In one embodiment, the FSK modem in the IDU transmits data to the ODU at 115.2 kbps. With this link speed it takes 8.68 microseconds to transmit a single bit of data from the IDU to the ODU. Assuming eight data bits, one start bit and one stop bit, one byte of data can be transmitted from the IDU to the ODU in 86.8 microseconds. If a parity bit is included, the byte of data is transmitted in 8.68×11=95.48 microseconds.

For this reason, if the IDU is programmed to begin sending the Mega Control Message 86.8 microseconds before the beginning of the 16.25 microsecond downlink time, the first complete byte of the message will be received at the start of the downlink time. If the micro controller 400 in the ODU is polling a UART or other buffer in the ODU to determine when the first byte of the message has been received from the IDU, it will be determine that the first byte has been received in the UART 166 at the start of the minimum downlink time.

As FIG. 14 illustrates, once the first byte has been received, the ODU resets the receive detectors. There is then a minimum time provided to allow the detectors to take a proper reading. In one embodiment, the minimum time is approximately 10 microseconds, however other detetctors with other minimum read times are within the scope of the invention, Note that this entire time is within the minimum downlink time, and thus is guaranteed to be measuring transmissions from the base station. Because it only takes 10 microseconds to read the power detectors, there is ample time to reset and read the detector within the 16.25 microsecond downlink time shown in this embodiment. After the detectors are read, the data from them is transmitted to the IDU in a Mega Response message.

Figure 15:
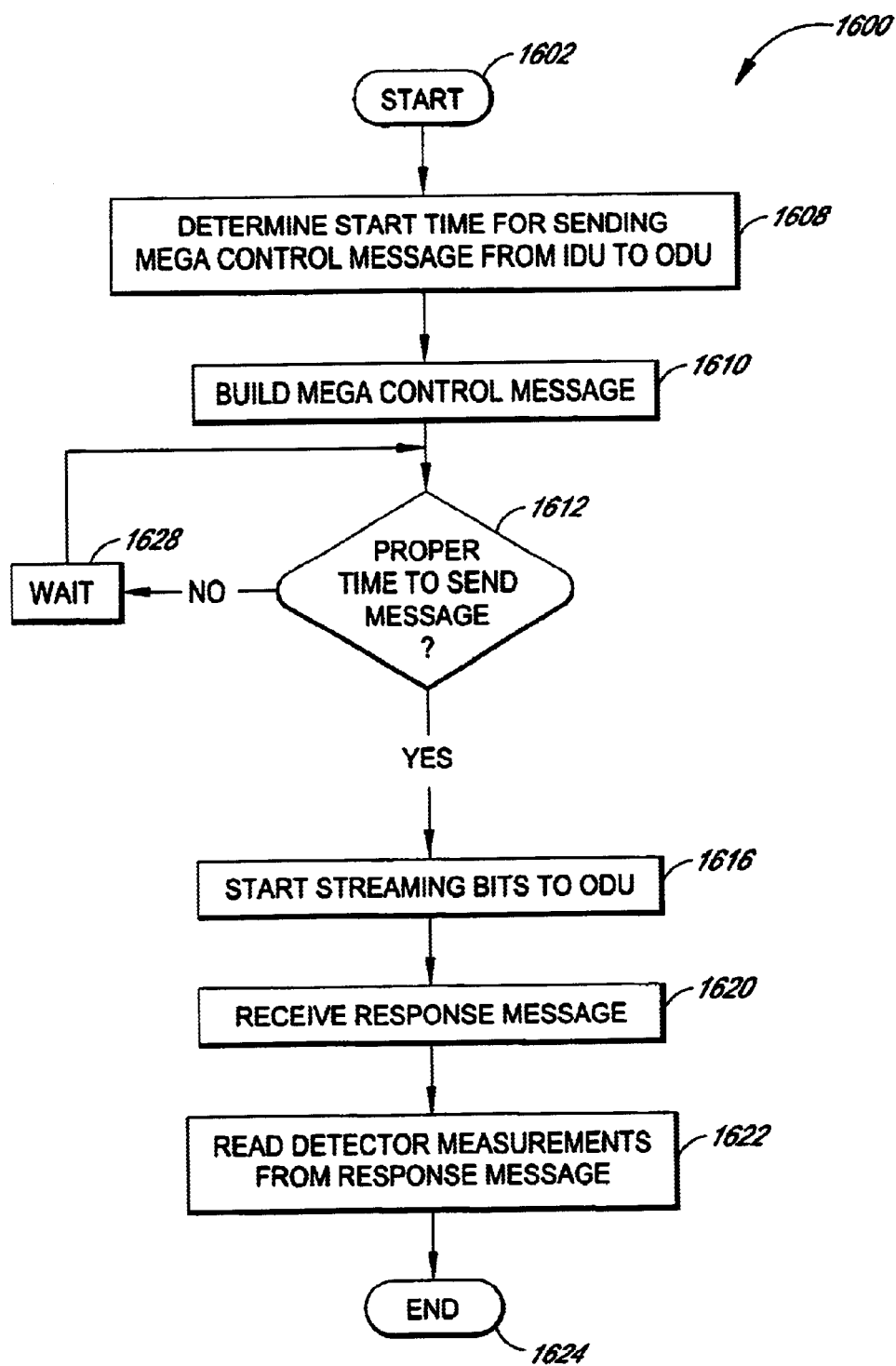
FIG. 15 is a flow diagram illustrating one embodiment of a process utilized by an indoor unit to transmit a message to an outdoor unit

FIG. 15 illustrates one embodiment of a process 1600 for sending the Mega Control message from the IDU to the ODU to initiate the process of reading receive detectors in a wireless communication system. In one embodiment, this process is stored in a memory, such as the FPGA 136 (FIG. 3). The process 1600 begins at start state 1602 and then moves to a state 1608 wherein the proper start time for sending a Mega Control message from the IDU to the ODU is determined. This determination is made to calculate the amount of time it takes to send one byte of data from the IDU to the ODU. Once this figure has been determined, the IDU will send the mega control message so that the last bit of the first byte arrives at the ODU at the start of the minimum downlink command time. Examples of these calculations are described above.

Once a determination is made of the proper time to begin sending a Mega control message, the process 1600 moves to a state 1610 wherein software instructions within the IDU begin to build a Mega Control message. Once the mega control message has been built, it is handed to the FPGA 136. The FPGA 136 is aware of the frame timing and is programmed with an offset time, relative to the start of the frame, at which time the control message should be sent. The process 1600 then moves to a decision state 1612 to determine whether it is the proper time to begin sending the message. If a determination is made that it is the proper time to begin transmitting bits of the message from the IDU to the ODU, the process 1600 moves to a state 1616 wherein the bits comprising the message are handed to the hardware of the IDU in order to be transmitted to the ODU.

Once the IDU begins streaming bits from the mega control message to the ODU, the process 1600 moves to a state 1620 wherein a mega response message is received from the ODU. As can be appreciated, the mega response message includes the values that are read from the detectors in the ODU. After the mega response message has been received, the process 1600 moves to a state 1622 wherein the detector measurements stored within the mega response message are read by instructions stored within the IDU. As can be appreciated, these detector measurements are then used to determine whether adjustments need to be made to subcomponents of the ODU in order to more specifically receive, or transmit, user data with the highest efficiency. The process 1600 then terminates at an end state 1624.

If a determination had been made at the decision state 1612 that it was not the proper time to send a mega control message from the IDU to the ODU, the process 1600 moves to a wait state 1628 before returning to the decision state 1612. Thus, this loop continues until the IDU determines it is the proper time to begin transmitting bits to the ODU.

Figure 16:
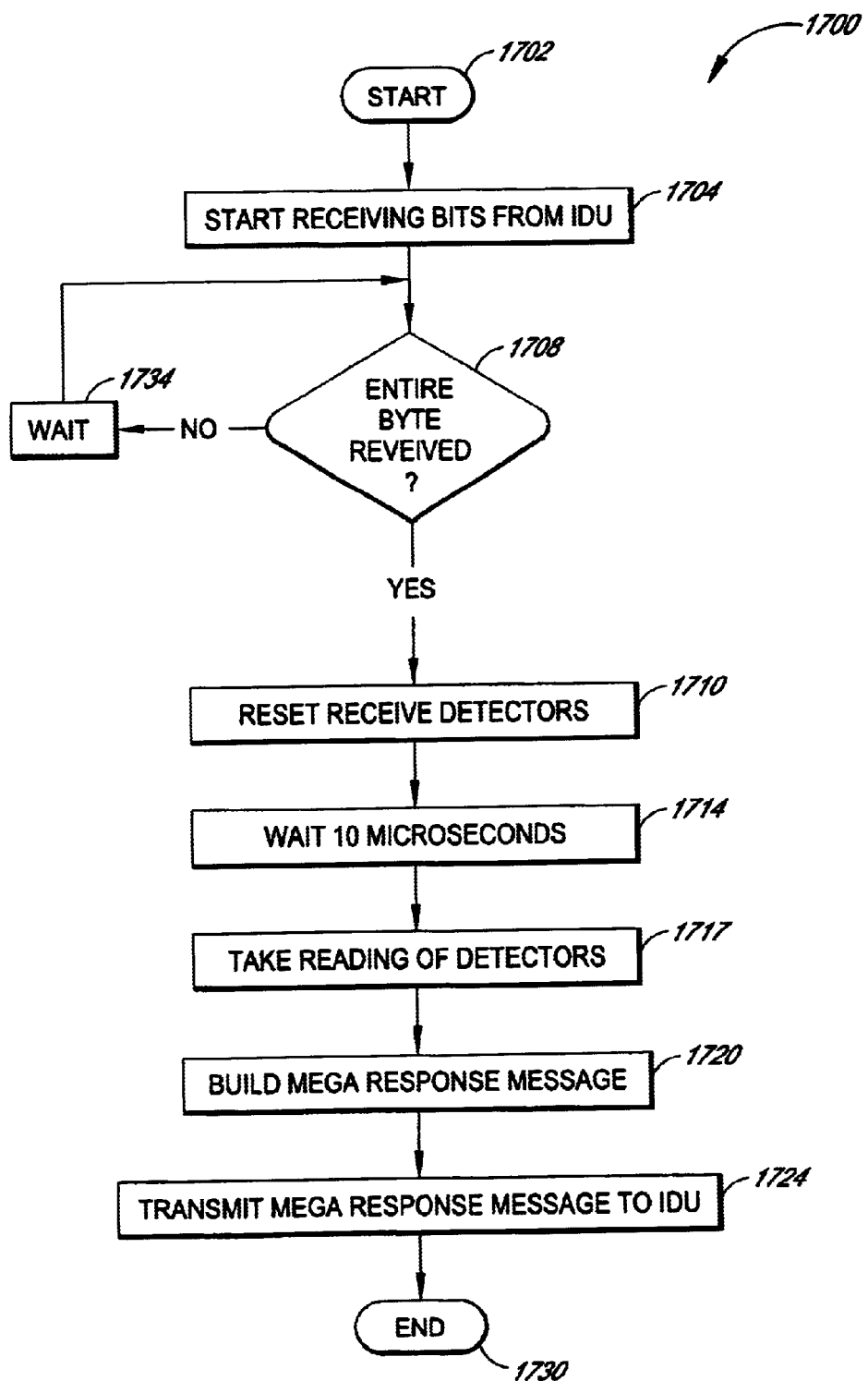
FIG. 16 is a flow diagram illustrating one embodiment of a process utilized by an outdoor unit to take detector readings during a downlink from a base station.

Referring now to FIG. 16, a process 1700 running within the FLASH memory 161 of the ODU is exemplified. The process 1700 begins at a start state 1702 and then moves to a state 1704 wherein the transmitted bits corresponding to the mega control message start to be received from the IDU. A determination is then made at a decision state 1708 whether an entire byte of data has been received by the ODU. This determination is preferably made by instructing the microcontroller 400 to continually pole the UART 166 that is buffering the streaming bits from the IDU. Once the microcontroller poles the buffer and determines that an entire byte has been received, the microcontroller moves to a state 1710 wherein the received detectors are reset. The process 1700 then waits 10 microseconds at a state 1714 before taking a reading of the receive detectors in the ODU at a state 1717.

Once the detector readings have been taken at the state 1717, the process 1700 moves to a state 1720 wherein the mega response message is built by instructions within the FLASH memory of ODU. These instructions then transmit the mega response message to the IDU at a state 1724. The process 1700 then terminates at an end state 1730.

Of course it should be realized that embodiments of the invention are not limited to any particular TDD frame timing or number of time slots within each frame. For example, while each TDD time frame might be 1 millisecond in duration, the TDD time frame might alternatively be 0.5, 2, 5, 7, 10, 12, 15 or more milliseconds of duration. Moreover, each frame might be divided into any number of time slots. For example, each frame might be divided into 500 to 10000 time slots.

Moreover, the location and duration of the minimum downlink time is not limited to the embodiment described in FIG. 14. For example, the downlink time does not need to be located at the beginning of each frame. In one alternate embodiment, the minimum downlink time is located at the end or middle of each frame. The only requirement being that the minimum downlink time be fixed in relation to each frame so that the mega control message can be timed so that the first byte of the message is received by the ODU at the beginning of the minimum downlink time slot.

E. Other Embodiments

Figure 17:
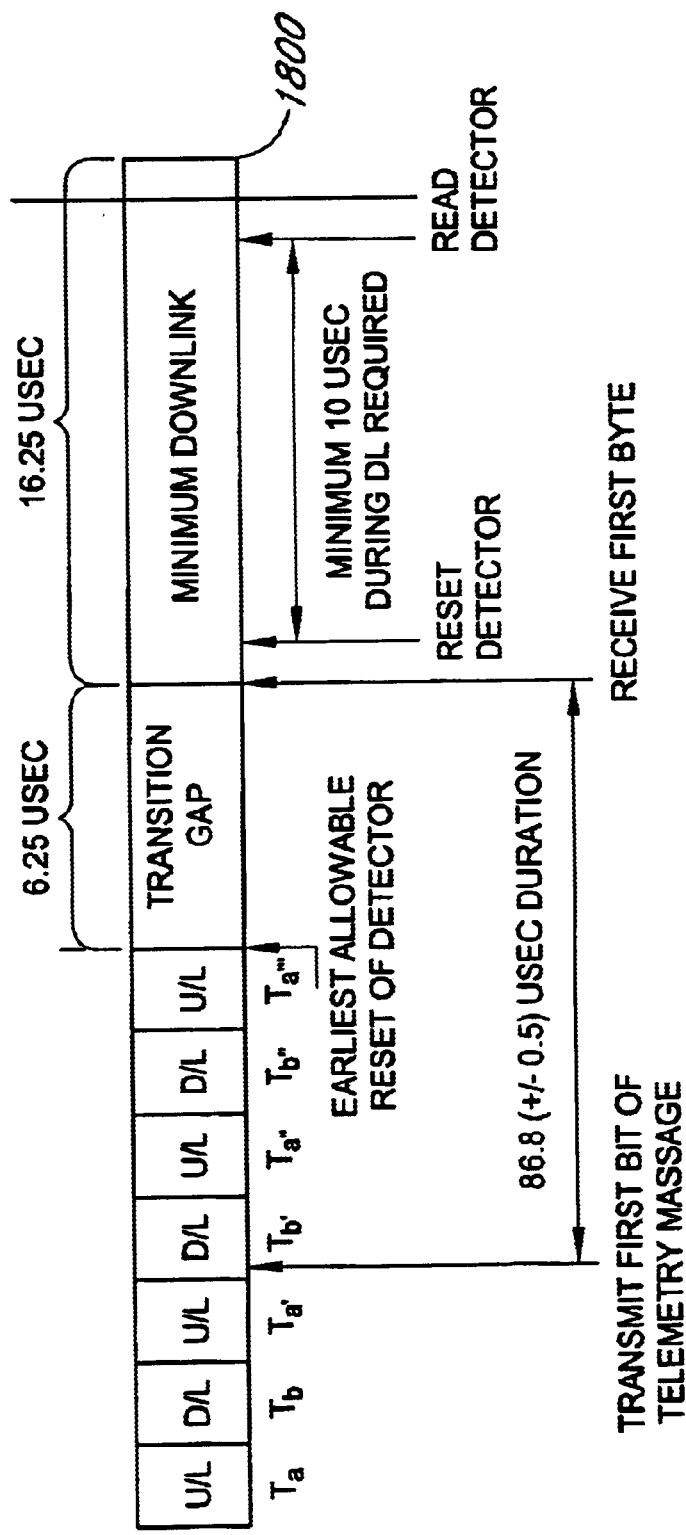
FIG. 17 is a block diagram of an alternate embodiment time frame for transmitting wireless user data between a base station and consumer premises equipment.

FIG. 17 illustrates an alternate embodiment of a TDD time frame used to transmit user data and to send Mega Control Messages to the ODU. As shown, a TDD transmission frame 1800 includes several uplink time slots Ta, Ta', Ta" and Ta'" for transmitting user data from the CPE to the base station. In addition, the transmission frame 1800 includes several dowlink time slots Tb, Tb' and Tb" for transmitting user data from the base station to a plurality of CPEs. Accordingly, the invention is not limited to TDD time frames wherein a first set of time slots in the frame are dedicated to downlinking and a second set of time slots are dedicated to uplinking user data. Other embodiments of mechanisms for transmitting user data in a TDD manner, as illustrated in FIG. 17 are also contemplated.

Accordingly, it is to be understood that the invention is not to be limited by the specific illustrated embodiment, but only by the scope of the appended claims.

What is claimed is:

1. A wireless communication system having a plurality of base stations and customer sites, wherein data is transferred between said base stations and said customer sites, and wherein said system comprises preset downlink time segments for transmitting said data between the base stations and the customer sites, comprising:
   an indoor unit comprising a first modem configured to modulate/demodulate data transmitted between the base stations and the customer sites, wherein the indoor unit is adapted to transmit a control message at a predetermined time with respect to said preset downlink time segments;
   an outdoor unit comprising a micro controller and a signal detector, said outdoor unit being adapted to receive the control message and, in response to receiving said control message, read said signal detector; and
   a broadband cable linking the indoor unit to the outdoor unit.

2. The system of claim 1, wherein the outdoor unit comprises a buffer that stores said control message as it is being transmitted from said indoor unit.

3. The system of claim 2, wherein said micro controller polls said buffer to determine when a first byte of the control message has been received.

4. The system of claim 3, wherein the micro controller is configured to instruct the signal detector to take a signal measurement in response to a determination that the buffer has received the first byte of the control message.

5. The system of claim 1, wherein the preset downlink time segment is within a time division duplex (TDD) frame.

6. The system of claim 5, wherein the preset downlink time segment comprises at least 16 microseconds of time.

7. The system of claim 5, wherein the TDD frame comprises a transition gap time adjacent said preset downlink time segment.

8. The system of claim 7, wherein said transition gap time is approximately 6 microseconds.

9. The system of claim 1, wherein said outdoor unit is configured to transmit a response message to the indoor unit.

10. The system of claim 9, wherein said response message comprises a value derived from reading said signal detector.

11. A wireless communication system having a plurality of base stations and customer sites, wherein data is transferred between said base stations and said customer sites, and wherein said system comprises preset downlink time segments for transmitting said data between the base stations and the customer sites, comprising:
   an indoor unit comprising a first modem configured to modulate/demodulate data transmitted between the base stations and the customer sites, said indoor unit further comprising a programmable memory adapted to transmit a control message at a predetermined time with respect to said preset downlink time segments;
   an outdoor unit comprising a micro controller and a signal detector, said outdoor unit being adapted to receive the control message and, in response to receiving said control message, read said signal detector; and a broadband cable linking the indoor unit to the outdoor unit.

12. The system of claim 11, wherein the outdoor unit comprises a buffer that stores said control message as it is being transmitted from said indoor unit.

13. The system of claim 12, wherein said micro controller polls said buffer to determine when a first byte of the control message has been received.

14. The system of claim 13, wherein the micro controller is configured to instruct the signal detector to take a signal measurement in response to a determination that the buffer has received the first byte of the control message.

15. The system of claim 11, wherein the preset downlink time segment is within a time division duplex (TDD) frame.

16. The system of claim 11, wherein the programmable memory is a field programmable gate array (FPGA).

17. The system of claim 11, wherein said outdoor unit is configured to transmit a response message to the indoor unit.

18. A method for measuring the strength of a signal transmitted from a base station to a customer site in a wireless communication system, wherein said wireless communication system has preset downlink time segments for transmitting data from the base station to the customer site, and wherein said customer site comprises an indoor unit and an outdoor unit, said method comprising:

transmitting a message from said indoor unit to said outdoor unit, wherein said message is timed to arrive at said outdoor unit at a predetermined time relative to said preset downlink time segment; and reading a detector in said outdoor unit in response to receipt of said message so that said detector is read during said preset downlink time segment.

19. The method of claim 18, wherein said predetermined time is a time just prior to the preset downlink time segment.

20. The method of claim 18, wherein reading said detector comprises resetting said detector, measuring said detector for a predetermined time, and thereafter taking a power reading of said detector.

21. The method of claim 18, wherein said message is transmitted as a frequency shift key modulated message.

22. The method of claim 18, wherein transmitting said message comprises transmitting said message to a buffer in said outdoor unit.

23. The method of claim 18, comprising transmitting a response message comprising values read from said detector from said outdoor unit to said indoor unit.

24. A method for tuning a wireless communication system, wherein said wireless communication system has preset downlink time segments for transmitting data from a base station to a customer site, and wherein said customer site comprises an indoor unit having a processor and an outdoor unit having tunable attenuators, said method comprising:

transmitting a control message from said indoor unit to said outdoor unit, wherein said message is timed to arrive at said outdoor unit at a predetermined time relative to said preset downlink time segment;

reading a detector in said outdoor unit in response to receipt of said message so that said detector will be read during said predetermined downlink time segment;

transmitting a response message comprising values from said detector to said indoor unit;

determining the appropriate settings said attenuators in said outdoor unit;

transmitting a second control message comprising updated attenuator settings to said outdoor unit; and tuning said outdoor unit based on said updated attenuator settings.

25. The method of claim 18, wherein said predetermined time is a time just prior to the preset downlink time segment.

26. The method of claim 18, wherein reading said detector comprises resetting said detector, measuring said detector for a predetermined time, and thereafter taking a power reading of said detector.

27. The method of claim 18, wherein said message is transmitted as a frequency shift key modulated message.

28. The method of claim 18, wherein transmitting said message comprises transmitting said message to a buffer in said outdoor unit.

* * * * *